US012581290B2

(12) United States Patent
Wu et al.

(10) Patent No.: US 12,581,290 B2
(45) Date of Patent: *Mar. 17, 2026

(54) SECURITY NEGOTIATION METHOD AND APPARATUS

(71) Applicant: Huawei Technologies Co., Ltd., Shenzhen (CN)

(72) Inventors: Rong Wu, Shenzhen (CN); Bo Zhang, Shenzhen (CN); Shuaishuai Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

This patent is subject to a terminal disclaimer.

(21) Appl. No.: 18/448,235

(22) Filed: Aug. 11, 2023

(65) Prior Publication Data

US 2024/0040376 A1 Feb. 1, 2024

Related U.S. Application Data

(63) Continuation of application No. 16/937,107, filed on Jul. 23, 2020, now Pat. No. 11,765,578, which is a (Continued)

(30) Foreign Application Priority Data

Feb. 6, 2018 (CN) .......................... 201810119888.9

(51) Int. Cl.
*H04L 9/40* (2022.01)
*H04W 12/033* (2021.01)
(Continued)

(52) U.S. Cl.
CPC ......... *H04W 12/033* (2021.01); *H04L 63/205* (2013.01); *H04W 12/041* (2021.01); *H04W 12/10* (2013.01)

(58) Field of Classification Search
CPC . H04W 12/033; H04W 12/041; H04W 12/10; H04W 88/085; H04W 12/00; H04L 63/205; H04L 67/141
See application file for complete search history.

(56) References Cited

U.S. PATENT DOCUMENTS 12,058,139 B2 * 8/2024 Sun ..................... H04W 12/033
2004/0029576 A1 2/2004 Flykt et al.
(Continued)

FOREIGN PATENT DOCUMENTS

CN 1475091 A 2/2004
CN 1855924 A 11/2006
(Continued)

OTHER PUBLICATIONS

Ronald Marx; "A Service-Oriented Approach on Securing User Plane Traffic between NGN Security Domains"; 2010 IEEE Wireless Communication and Networking Conference; Year: 2010; Conference Paper; Publisher: IEEE; pp. 1-6 (Year: 2010).*
(Continued)

*Primary Examiner* — Shewaye Gelagay
*Assistant Examiner* — Courtney D Fields
(74) *Attorney, Agent, or Firm* — Conley Rose, P.C.

(57) ABSTRACT

A security negotiation method includes receiving, by a terminal, security negotiation information from a centralized unit control plane (CU-CP)/a centralized unit user plane (CU-UP), where the security negotiation information includes an integrity protection indication identifier of the CU-UP, and determining, by the terminal based on the integrity protection indication identifier, whether to enable user-plane integrity protection of the terminal.

20 Claims, 11 Drawing Sheets

Related U.S. Application Data continuation of application No. PCT/CN2019/070712, filed on Jan. 7, 2019.

(51) Int. Cl.

| | |
|---|---|
| *H04W 12/04* | (2021.01) |
| *H04W 12/041* | (2021.01) |
| *H04W 12/10* | (2021.01) |
| *H04W 88/08* | (2009.01) |
| *H04W 92/04* | (2009.01) |

(56) References Cited

U.S. PATENT DOCUMENTS

| | | |
|---|---|---|
| 2006/0288204 A1 | 12/2006 | Sood et al. |
| 2007/0061878 A1 | 3/2007 | Hagiu et al. |
| 2009/0300358 A1 | 12/2009 | Pang et al. |
| 2012/0170746 A1 | 7/2012 | Chen et al. |
| 2013/0267202 A1 | 10/2013 | Palanigounder et al. |
| 2015/0163678 A1 | 6/2015 | Zhang et al. |
| 2018/0007552 A1 | 1/2018 | Bae et al. |
| 2018/0070237 A1 * | 3/2018 | Cho ..................... H04W 48/08 |
| 2018/0083972 A1 * | 3/2018 | Kim .................... H04L 41/0853 |
| 2018/0167807 A1 | 6/2018 | Ying et al. |
| 2018/0213403 A1 | 7/2018 | Shi |
| 2019/0082325 A1 * | 3/2019 | Muhanna .............. H04W 12/04 |
| 2019/0132735 A1 * | 5/2019 | Ying .................... H04W 12/06 |
| 2021/0022203 A1 | 1/2021 | Kang et al. |

FOREIGN PATENT DOCUMENTS

| | | | | |
|---|---|---|---|---|
| CN | 1937489 A | 3/2007 | | |
| CN | 101199182 A | 6/2008 | | |
| CN | 101702818 A | 5/2010 | | |
| CN | 101835156 A | 9/2010 | | |
| CN | 102209320 A | 10/2011 | | |
| CN | 102448058 A | 5/2012 | | |
| CN | 102014381 B | 12/2012 | | |
| CN | 104244247 A | 12/2014 | | |
| CN | 104994503 A | 10/2015 | | |
| CN | 106102106 A | 11/2016 | | |
| CN | 106162730 A | 11/2016 | | |
| CN | 106375989 A | 2/2017 | | |
| CN | 106792676 A | 5/2017 | | |
| CN | 107567018 A | 1/2018 | | |
| WO | 2017024579 A1 | 2/2017 | | |
| WO | 2017076891 A1 | 5/2017 | | |
| WO | WO-2018006017 A1 * | 1/2018 | ............ | H04W 12/06 |
| WO | WO-2018009340 A1 * | 1/2018 | ............ | H04W 88/08 |
| WO | 2020135850 A1 | 7/2020 | | |

OTHER PUBLICATIONS

Marx, R., "A service-oriented on securing user plane traffic between NGN security domains," 2010 IEEE Wireless Communication and Networking Conference, Conference Paper, May 2010, 3 pages.

3GPP TS 33.501 V0.6.0 (Dec. 2017), "3rd Generation Partnership Project; Technical Specification Group Services and System Aspects; Security Architecture and Procedures for 5G System (Release 15)," 79 pages.

SA2, "Reply LS on QoS for Priority Services." 3GPP TSG-RAN WG3 #95, Athens, Greece, Feb. 13-17, 2017, R3-170350, 12 pages.

LG Electronics Inc.,"Issues on Security for CU-CP and CU-UP Separation",3GPP TSG-RAN WG3 Meeting #98 R3-174363, Reno, Nevada, USA, Nov. 27-Dec. 1, 2017,Total 2 Pages.

3GPP TR 38.806 V15.0.0 (Dec. 2017), 3rd Generation Partnership Project;Technical Specification Group Radio Access Network;Study of separation of NR Control Plane (CP) and User Plane(UP) for split option 2;(Release 15), 22 pages.

Huawei, "Discussions on Security handling for CP-UP separation",3GPP TSG-RAN3 Meeting # 98 R3-174467,Reno, Nevada, US, Nov. 27-Dec. 1, 2017,Total 4 Pages.

Samsung, "Security Aspects for CU-UP",3GPP TSG-RAN WG3 NR AdHoc 1801 R3-180260,Sophia Antipolis, France, Jan. 22-26, 2018,Total 2 Pages.

3GPP TS 23.502 V15.0.0 (Dec. 2017);3rd Generation Partnership Project;Technical Specification Group Services and System Aspects;Procedures for the 5G System; Stage 2(Release 15);Total 258 Pages.

3GPP TS 38.331 V15.0.0 (Dec. 2017);3rd Generation Partnership Project;Technical Specification Group Radio Access Network;NR-;Radio Resource Control (RRC) protocol specification(Release 15);Total 188 Pages.

SA2, "TS 23.214 support for transport level packet marking," SA WG2 Meeting #118bis, S2-170434, Jan. 16-20, 2017, 2 pages.

SA2, "TS 23.401 support for transport level packet marking," SA WG2 Meeting #118bis, S2-170435, Jan. 16-20, 2017, 6 pages.

SA2, "TS 23.203 support for transport level packet marking," SA WG2 Meeting #118bis, S2-170433, Jan. 16-20, 2017, 2 pages.

Lu Xiao-dong et al: "Study of 5G RAN Architecture Based on C-U Split", 2016, 6 pages.

* cited by examiner

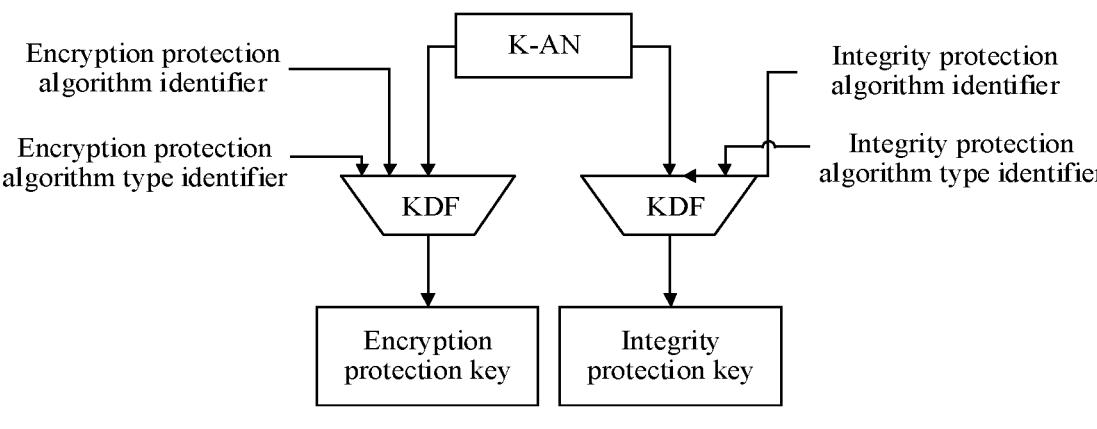
FIG. 7
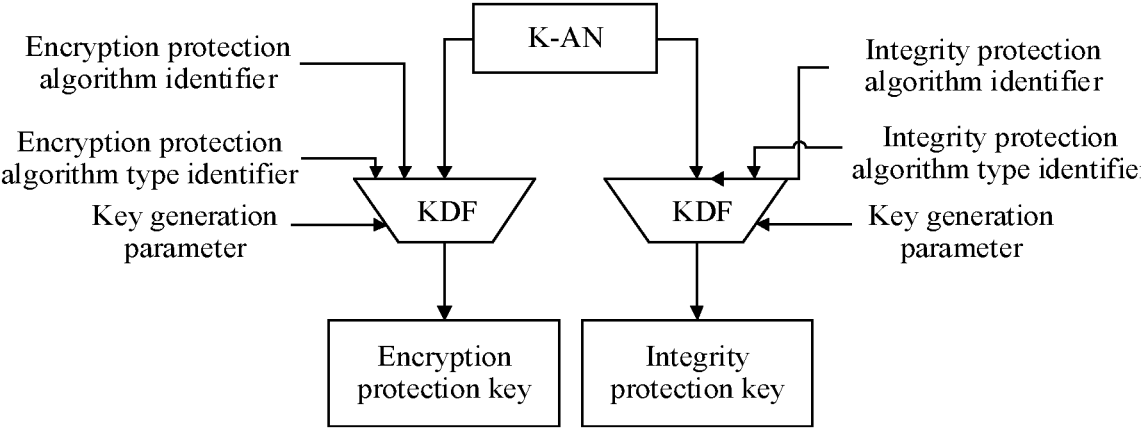
FIG. 8
K-AN
Key generation
parameter
KDF
Substitute an identifier
of a CU-UP
Substitute an
identifier of a CU-UP
Encryption protection
algorithm identifier
KDF
KDF
Integrity protection
algorithm identifier
Encryption protection
algorithm type identifier
Integrity protection
algorithm type identifier
Encryption
protection key
Integrity
protection key
FIG. 9

SECURITY NEGOTIATION METHOD AND APPARATUS

CROSS-REFERENCE TO RELATED APPLICATIONS

This is a continuation of U.S. patent application Ser. No. 16/937,107, filed on Jul. 23, 2020, which is a continuation of Int'l Patent App. No. PCT/CN2019/070712, filed on Jan. 7, 2019, which claims priority to Chinese Patent App No. 201810119888.9, filed on Feb. 6, 2018, all of which are incorporated by reference.

FIELD

This application relates to the field of wireless communications, and in particular, to a security negotiation method and apparatus.

BACKGROUND

A basic processing unit of a future network on an access network (AN) side is split into a centralized unit (CU) and a distributed unit (DU). The CU may be further split into a control-plane function entity and a user-plane function entity, and correspondingly, there are a control-plane function network element device and a user-plane function network element device. Further, this function decoupling is mainly further function splitting of a CU of an AN device. To ensure communication security in this scenario, an effective access security negotiation mechanism needs to be provided.

However, a current security negotiation mechanism is mainly an authentication server (AS) security mode command (SMC) process in a Long-Term Evolution (LTE) technology, namely, an interaction process between a terminal and a base station. The security negotiation mechanism in other approaches is not applicable to a scenario in which a control-plane function entity and a user-plane function entity are separated from each other.

SUMMARY

This application provides a security negotiation method and apparatus, to implement security negotiation in a scenario in which a control-plane function entity and a user-plane function entity are separated from each other.

According to a first aspect, this application provides a security negotiation method. The method includes receiving, by a terminal, security negotiation information sent by a CU control plane (CU-CP), where the security negotiation information includes an integrity protection indication identifier of a CU-UP, and determining, by the terminal based on the integrity protection indication identifier of the CU-UP, whether to enable user-plane integrity protection of the terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a media access control (MAC) layer identifier, a Radio Resource Control (RRC) signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes receiving, by the terminal, air interface information sent by the CU-CP, where the air interface information includes a key generation parameter, and the key generation parameter includes one or more of the following an instance identifier, a CU-UP identifier, a DU identifier, a data bearer identifier, a bearer identifier, a stream identifier, a session identifier, a slice identifier, a MAC layer identifier, a RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the terminal, a user-plane integrity protection key of the CU-UP based on the key generation parameter.

Optionally, the method further includes sending, by the terminal, a first session establishment request to a session management function entity (SMF), where the first session establishment request includes one or more of the following parameters: one piece or a plurality of pieces of single network slice selection assistance information (S-NSSAI), a data network name (DNN), a protocol data unit (PDU) session identifier (ID), a request type, an old PDU session ID, and an N1 session management (SM) container (PDU session establishment request).

Optionally, determining, by the terminal based on the integrity protection indication identifier of the CU-UP, whether to enable integrity protection of the terminal includes determining, by the terminal, after sending the first session establishment request to the SMF, based on the integrity protection indication identifier of the CU-UP, whether to enable integrity protection of the terminal.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is enabled, to enable session-based user-plane integrity protection of the terminal.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is enabled, to enable user-plane integrity protection of the terminal.

Optionally, after determining, by the terminal, to enable integrity protection of the terminal, the method further includes sending, by the terminal, an integrity protection parameter to the CU-CP.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is not enabled, not to enable integrity protection of the terminal.

Optionally, after determining, by the terminal, not to enable integrity protection of the terminal, the method further includes sending, by the terminal, a security negotiation response to the CU-CP, where the security negotiation response includes an integrity protection parameter and an indication identifier that is used to indicate that integrity protection of the terminal is enabled.

Optionally, the security negotiation information further includes an encryption protection indication identifier of the CU-UP, and the method further includes determining, by the terminal based on the encryption protection indication identifier of the CU-UP, whether to enable encryption protection of the terminal.

Optionally, the security negotiation information further includes an encryption protection indication identifier of the CU-UP, and the method further includes determining, by the terminal, after the first session establishment request is sent to the SMF, based on the encryption protection indication identifier of the CU-UP, whether to enable session-based encryption protection of the terminal.

Optionally, the method further includes generating, by the terminal, a user-plane encryption protection key of the CU-UP based on the key generation parameter.

Optionally, the security negotiation information further includes one or more of the following an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

According to a second aspect, this application provides a security negotiation method. The method includes receiving, by a terminal, security negotiation information sent by a CU-CP, where the security negotiation information includes an encryption protection indication identifier of a CU-UP, and determining, by the terminal based on the encryption protection indication identifier of the CU-UP, whether to enable user-plane encryption protection of the terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes receiving, by the terminal, air interface information sent by the CU-CP, where the air interface information includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the terminal, an encryption protection key of the CU-UP based on the key generation parameter.

Optionally, the security negotiation information further includes an integrity protection indication identifier of the CU-UP, and the method further includes determining, by the terminal based on the integrity protection indication identifier of the CU-UP, whether to enable user-plane integrity protection of the terminal.

Optionally, determining, by the terminal based on the integrity protection indication identifier of the CU-UP, whether to enable user-plane integrity protection of the terminal includes determining, by the terminal when the integrity protection indication identifier of the CU-UP indicates that integrity protection of the CU-UP is enabled, to enable user-plane integrity protection of the terminal.

Optionally, the method further includes sending, by the terminal, a first session establishment request to a session management function entity SMF, where the first session establishment request includes one or more of the following parameters one piece or a plurality of pieces of S-NSSAI, a DNN, a PDU session ID, a request type, an old PDU session ID, and an N1 SM container (PDU session establishment request).

Optionally, determining, by the terminal based on the integrity protection indication identifier of the CU-UP, whether to enable integrity protection of the terminal includes determining, by the terminal, after sending the first session establishment request to the SMF, based on the integrity protection indication identifier of the CU-UP, whether to enable integrity protection of the terminal.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is enabled, to enable session-based user-plane integrity protection of the terminal.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is enabled, to enable user-plane integrity protection of the terminal.

Optionally, after determining, by the terminal, to enable integrity protection of the terminal, the method further includes sending, by the terminal, an integrity protection parameter to the CU-CP.

Optionally, determining, by the terminal based on the integrity protection indication identifier of the CU-UP, whether to enable integrity protection of the terminal includes determining, by the terminal when the integrity protection indication identifier of the CU-UP indicates that integrity protection of the CU-UP is not enabled, not to enable integrity protection of the terminal.

Optionally, after determining, by the terminal, not to enable integrity protection of the terminal, the method further includes sending, by the terminal, a security negotiation response to the CU-CP, where the security negotiation response includes an integrity protection parameter and an indication identifier that is used to indicate that integrity protection of the terminal is enabled.

Optionally, the security negotiation information further includes an encryption protection indication identifier of the CU-UP, and the method further includes determining, by the terminal, after the first session establishment request is sent to the SMF, based on the encryption protection indication identifier of the CU-UP, whether to enable session-based encryption protection of the terminal.

According to a third aspect, this application provides a security negotiation method. The method includes receiving, by a terminal, security negotiation information sent by a user plane CU (CU-UP), where the security negotiation information includes an integrity protection indication identifier of the CU-UP, and determining, by the terminal based on the integrity protection indication identifier of the CU-UP, whether to enable user-plane integrity protection of the terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes receiving, by the terminal, air interface information sent by the CU-UP, where the air interface information includes a key generation parameter, and the key generation parameter includes one or more of the following an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the terminal, an integrity protection key of the CU-UP based on the key generation parameter.

Optionally, the security negotiation information further includes an encryption protection indication identifier of the CU-UP, and the method further includes determining, by the terminal based on the encryption protection indication identifier of the CU-UP, whether to enable encryption protection of the terminal.

Optionally, the method further includes generating, by the terminal, an encryption protection key of the CU-UP based on the key generation parameter.

According to a fourth aspect, this application provides a security negotiation method. The method includes receiving, by a terminal, security negotiation information sent by a CU-UP, where the security negotiation information includes an encryption protection indication identifier of the CU-UP, and determining, by the terminal based on the encryption protection indication identifier of the CU-UP, whether to enable user-plane encryption protection of the terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes receiving, by the terminal, air interface information sent by the CU-UP, where the air interface information includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the terminal, an integrity protection key of the CU-UP based on the key generation parameter.

Optionally, the security negotiation information further includes an encryption protection indication identifier of the CU-UP, and the method further includes determining, by the terminal based on the encryption protection indication identifier of the CU-UP, whether to enable encryption protection of the terminal.

Optionally, the method further includes generating, by the terminal, an encryption protection key of the CU-UP based on the key generation parameter.

According to a fifth aspect, this application provides a security negotiation method. The method includes determining, by a CU-CP, security negotiation information, where the security negotiation information includes an integrity protection indication identifier of a CU-UP, and sending, by the CU-CP, the security negotiation information to a terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes sending, by the CU-CP, air interface information to the terminal, where the air interface information includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the CU-CP, a user-plane integrity protection key of the CU-UP based on the key generation parameter.

Optionally, after generating, by the CU-CP, an integrity protection key of the CU-UP based on the key generation parameter, the method further includes sending, by the CU-CP, the user-plane integrity protection key of the CU-UP to the CU-UP.

Optionally, the security negotiation information further includes an encryption protection indication identifier of the CU-UP.

Optionally, the method further includes generating, by the CU-CP, a user-plane encryption protection key of the CU-UP based on the key generation parameter.

Optionally, the method further includes sending, by the CU-CP, the user-plane encryption protection key of the CU-UP to the CU-UP.

Optionally, the method further includes generating, by the CU-CP, a base key, and sending, by the CU-CP, the base key to the CU-UP.

Optionally, the method further includes receiving, by the CU-CP, a second session establishment request sent by a session management function entity SMF after the SMF receives a first session establishment request sent by the terminal, and sending, by the CU-CP, a session establishment response to the SMF.

Optionally, the security negotiation information further includes one or more of an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

According to a sixth aspect, this application provides a security negotiation method. The method includes determining, by a CU-CP, security negotiation information, where the security negotiation information includes an encryption protection indication identifier of a CU-UP, and sending, by the CU-CP, the security negotiation information to a terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes sending, by the CU-CP, air interface information to the terminal, where the air interface information includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the CU-CP, a user-plane encryption protection key of the CU-UP based on the key generation parameter.

Optionally, the method further includes sending, by the CU-CP, the user-plane encryption protection key of the CU-UP to the CU-UP.

Optionally, the security negotiation information further includes an integrity protection indication identifier of the CU-UP.

Optionally, the method further includes generating, by the CU-CP, a user-plane integrity protection key of the CU-UP based on the key generation parameter.

Optionally, after generating, by the CU-CP, an integrity protection key of the CU-UP based on the key generation parameter, the method further includes sending, by the CU-CP, the user-plane integrity protection key of the CU-UP to the CU-UP.

Optionally, the method further includes generating, by the CU-CP, a base key, and sending, by the CU-CP, the base key to the CU-UP.

Optionally, the method further includes receiving, by the CU-CP, a second session establishment request sent by a session management function entity SMF after the SMF receives a first session establishment request sent by the terminal, and sending, by the CU-CP, a session establishment response to the SMF.

Optionally, the security negotiation information further includes one or more of an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

According to a seventh aspect, this application provides a security negotiation method. The method includes determining, by a CU-UP, security negotiation information, where the security negotiation information includes an integrity protection indication identifier of the CU-UP, and sending, by the CU-UP, the security negotiation information to a terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes sending, by the CU-UP, air interface information to the terminal, where the air interface information includes a key generation parameter, and the key generation parameter includes one or more of the following an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the CU-UP, a user-plane integrity protection key of the CU-UP based on the key generation parameter.

Optionally, the security negotiation information further includes an encryption protection indication identifier of the CU-UP.

Optionally, the method further includes generating, by the CU-UP, a user-plane encryption protection key of the CU-UP based on the key generation parameter.

According to an eighth aspect, this application provides a security negotiation method. The method includes determining, by a CU-UP, security negotiation information, where the security negotiation information includes an encryption protection indication identifier of the CU-UP, and sending, by the CU-UP, the security negotiation information to a terminal.

Optionally, the security negotiation information further includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-UP, a user-plane integrity protection algorithm type identifier length of the CU-CP, a user-plane encryption protection type identifier length of the CU-UP, and a user-plane encryption protection type identifier length of the CU-CP.

Optionally, the method further includes sending, by the CU-UP, air interface information to the terminal, where the air interface information includes a key generation parameter, and the key generation parameter includes one or more of an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-CP, a user-plane integrity protection algorithm type identifier length of the CU-CP, a user-plane encryption protection type identifier length of the CU-UP, and a user-plane encryption protection type identifier length of the CU-CP.

Optionally, the method further includes generating, by the CU-UP, a user-plane encryption protection key of the CU-UP based on the key generation parameter.

Optionally, the security negotiation information further includes an integrity protection indication identifier of the CU-UP.

Optionally, the method further includes generating, by the CU-UP, a user-plane integrity protection key of the CU-UP based on the key generation parameter.

According to a ninth aspect, this application provides a security negotiation apparatus, where the apparatus includes modules or means configured to perform the methods provided in the first to the eighth aspects and the various implementations of the first to the eighth aspects.

According to a tenth aspect, this application provides a security negotiation apparatus. The apparatus includes a processor and a memory. The memory is configured to store a program. The processor invokes the program stored in the memory, to perform the method provided in any one of the first aspect to the fourth aspect of this application. The apparatus may be a terminal, or may be a chip on a terminal.

According to an eleventh aspect, this application provides a security negotiation apparatus. The apparatus includes a processor and a memory. The memory is configured to store a program. The processor invokes the program stored in the memory, to perform the method provided in the fifth aspect or the sixth aspect of this application. The apparatus may be a CU-CP, or may be a chip on a CU-CP.

According to a twelfth aspect, this application provides a security negotiation apparatus. The apparatus includes a processor and a memory. The memory is configured to store a program. The processor invokes the program stored in the memory, to perform the method provided in the seventh aspect or the eighth aspect of this application. The apparatus may be a CU-UP, or may be a chip on a CU-UP.

According to a thirteenth aspect, this application provides a computer storage medium. The computer storage medium is configured to store a program, and the program is configured to perform any method according to the first aspect to the eighth aspect.

In the security negotiation method and apparatus provided in this application, the CU-CP or the CU-UP determines the security negotiation information, and sends the security negotiation information to the terminal. After receiving the security negotiation information, the terminal may determine, based on an indication of the security negotiation information, whether to enable user-plane integrity protection of the terminal. In this way, user-plane security negotiation with the terminal can be completed in a scenario in which the CU-CP and the CU-UP are separated from each other.

BRIEF DESCRIPTION OF THE DRAWINGS

FIG. 7 is a schematic diagram of key generation according to this application;

FIG. 8 is another schematic diagram of key generation according to this application;

FIG. 9 is still another schematic diagram of key generation according to this application;

DETAILED DESCRIPTION

Figure 1:
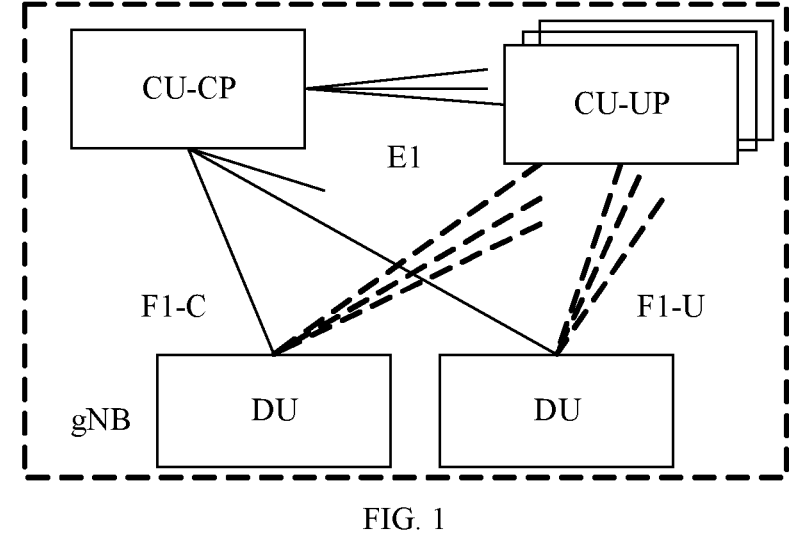
FIG. 1 is a schematic diagram of a communications system.

FIG. 1 is a schematic diagram of a communications system. As shown in FIG. 1, the system includes a DU, a CU-CP, and a CU-UP.

As shown in FIG. 1, the system may be a network device system, and includes one CU-CP, a plurality of DUs, and a plurality of CU-UPs. The CU-CP and the DU may be connected via an F1-C interface, the CU-UP and the DU may be connected via an F1-U interface, and the CU-UP and the CU-CP may be connected via an E1 interface.

The DU covers some functions of a physical layer for baseband processing and a MAC layer/radio link control (RLC) layer. In view of a transmission resource between a radio remote unit (RRU) and the DU, physical layer functions of a part of the DUs may be moved up to the RRU. With miniaturization of the RRU, even more radically, the DU may be combined with the RRU. Deployment of the DUs depends on an actual network environment. For example, in a core urban area, an area with relatively high traffic density, an area with a small inter-site distance, and an area with a limited equipment room resource, such as a university and a large performance venue, the DUs may be deployed in a centralized manner. In an area with relatively sparse traffic and an area with a large inter-site distance, such as a suburb and a mountainous area, the DUs may be deployed in a distributed manner.

The CU covers a higher-layer protocol stack of a radio access network (RAN) and some functions of a core network, for example, some functions of a RRC layer, a Packet Data Convergence Protocol (PDCP) layer, and the like, and even can also support moving some core network functions downwards to an AN. The core network functions may be referred to as an edge computing network, which can meet a higher requirement of a future communication network on a network latency of an emerging service, such as video, online shopping, or virtual/augmented reality.

After further splitting, the CU-CP covers some functions of the RRC protocol layer and the PDCP protocol layer, and mainly manages and schedules resources of the DU and the CU-UP, and manages and forwards control signaling.

The CU-UP mainly covers some functions of the PDCP protocol layer, and mainly transmits user data (UP Traffic), and when a session arrives, transmits data.

In a 5th generation (5G) network, especially supported by a cloudification technology, decoupling of a user plane and a control plane can implement simultaneous connection of networks of different standards. Control-plane signaling related to a service session is carried on a conventional network that has implemented continuous coverage. On a data plane, high-speed data is carried on the 5G network in an area with 5G network coverage, and is carried on a conventional network in an area without 5G network coverage. In this way, the 5G network can be completely deployed on demand, and continuous coverage does not need to be considered.

During specific deployment, one DU may be connected to one CU-UP, and one CU-UP is connected to one CU-CP. In a special case, one CU-UP may be connected to a plurality of CU-CPs. A plurality of CU-UPs may be connected to one DU. A plurality of DUs may be connected to one CU-UP. This is not limited in this application. The following describes several typical scenarios, and the scenarios are applicable to a method provided in this application.

Figure 2:
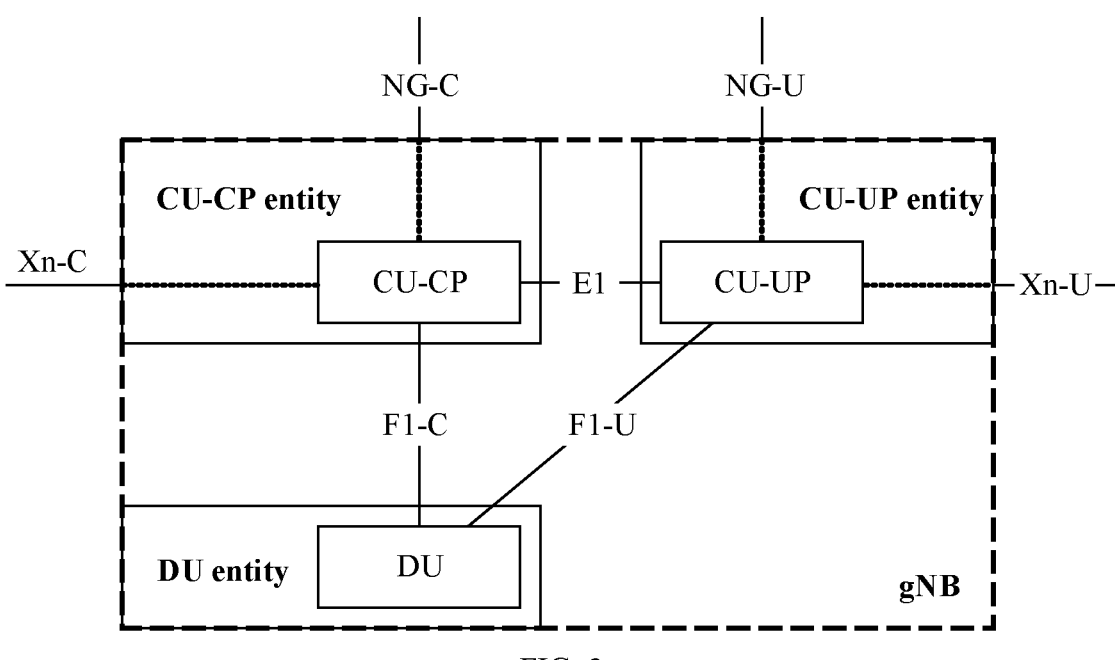
FIG. 2 is another schematic diagram of a communications system scenario.

FIG. 2 is another schematic diagram of a communications system scenario.

As shown in FIG. 2, a CU-CP and a CU-UP are in a centralized deployment location, for example, deployed in an equipment room.

In this way, a cloud technology is better used, and both the CU-CP and the CU-UP may be implemented through virtualization. The CU-CP is located at a center, to better provide load balancing and resource coordination for a DU.

Figure 3:
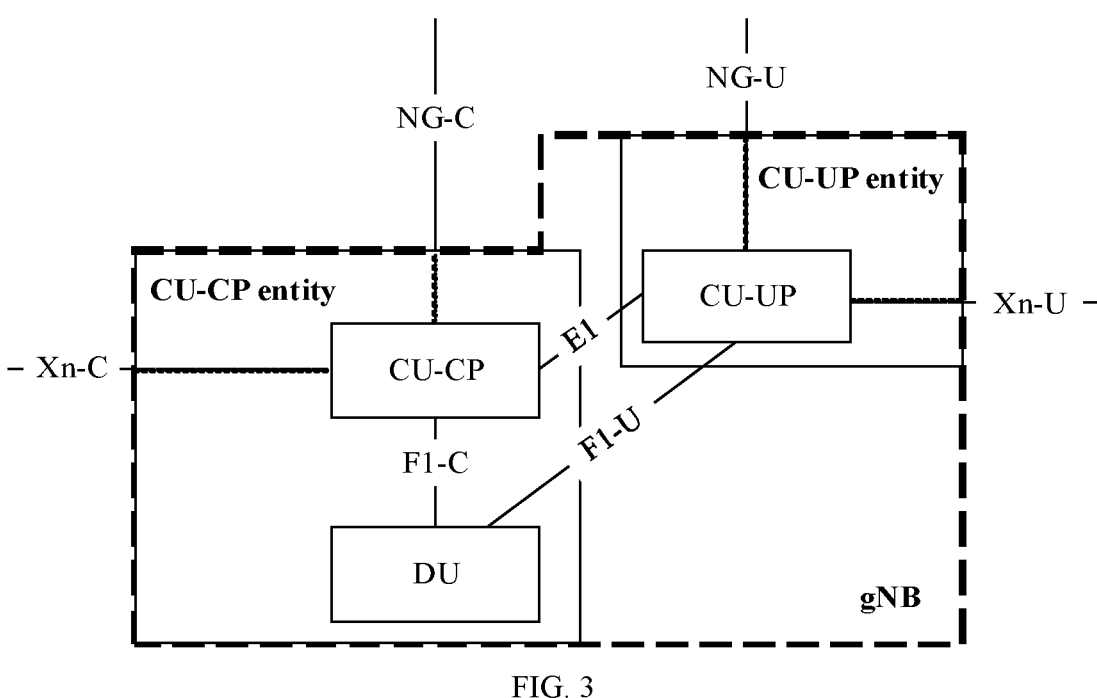
FIG. 3 is still another schematic diagram of a communications system scenario.

FIG. 3 is still another schematic diagram of a communications system scenario.

As shown in FIG. 3, a CU-CP is deployed outdoors, like a DU, and one CU-CP manages one DU. This is applied to a scenario in which there are a large quantity of signaling operations. The CU-CP manages a single DU. For example, this is applied to critical communication and a scenario in which a key needs to be periodically changed. However, a CU-UP may be implemented using a cloud, that is, implemented using a cloud server (cloud).

A latency between the CU-CP and the CU-UP is increased. This is applied to a scenario in which there are large quantities of link reestablishments, handovers, and state transitions, specially, for example, a mobility scenario such as the internet of vehicles.

Figure 4:
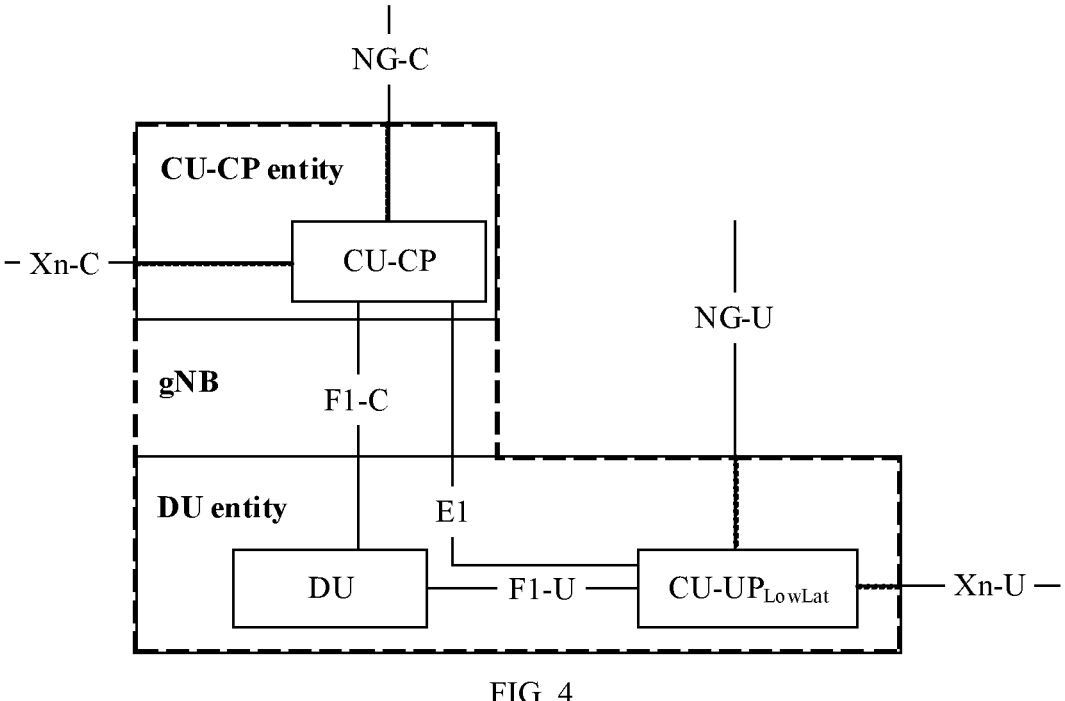
FIG. 4 is yet another schematic diagram of a communications system scenario.

FIG. 4 is yet another schematic diagram of a communications system scenario.

As shown in FIG. 4, the scenario may be, for example, a highly reliable communication (Ultra-Reliable Low-Latency Communications (URLLC)) scenario, in which UP transmission (traffic) after one central interaction may be performed, or cloud implementation may be performed on a UP side, to implement a low latency of data transmission, for example, critical mission critical communication (MCC).

This application provides a security negotiation method, applied to a scenario in which a CU-CP and a CU-UP are separated from each other, for example, the foregoing scenario. However, this is not limited to the foregoing scenario.

In this embodiment of this application, a terminal (terminal device) includes but is not limited to a mobile station (MS), a mobile terminal, a mobile telephone, a handset, portable equipment, and the like. The terminal may communicate with one or more core networks via a RAN. For example, the terminal may be a mobile telephone (or referred to as a "cellular" telephone), or a computer having a wireless communication function, the terminal may further be a portable, pocket-sized, handheld, computer built-in, or vehicle-mounted mobile apparatus or device.

A network device may be a device configured to communicate with the terminal. For example, the network device may be a base transceiver station (BTS) in a Global System for Mobile Communications (GSM) system or code-division multiple access (CDMA) system, or may be a NodeB (NB) in a wideband CDMA (WCDMA) system, or may be an Evolved NodeB (eNB or eNodeB) in an LTE system or a next generation NB (gNB) in a future 5G network.

Figure 5:
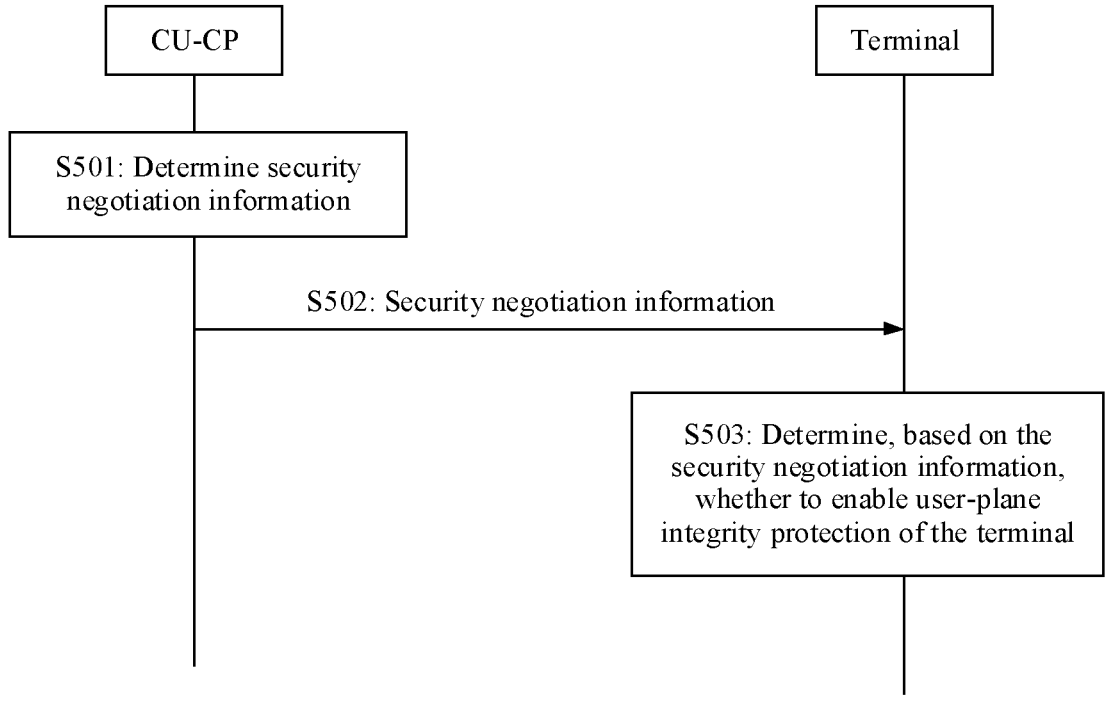
FIG. 5 is a schematic flowchart of a security negotiation method according to an embodiment of this application.

FIG. 5 is a schematic flowchart of a security negotiation method according to an embodiment of this application. As shown in FIG. 5, the method includes the following steps.

S501: A CU-CP determines security negotiation information.

S502: The CU-CP sends the security negotiation information to a terminal.

The security negotiation information includes an integrity protection indication identifier (UP integrity indication) of a CU-UP.

The integrity protection indication identifier of the CU-UP is used to indicate whether integrity protection of the CU-UP is enabled.

The security negotiation information may be carried in an AS SMC, or carried in a CP SMC, or carried in a command such as an air interface reconfiguration message (RRC Reconfiguration Request). This is not limited in this application.

In an optional implementation, before S501, the CU-CP obtains keys of all CU-UPs. The CU-CP may generate the keys of all the CU-UPs, or the CU-UPs may send the keys of the CU-UPs to the CU-CP. This is not limited herein.

The integrity protection indication identifier of the CU-UP may be a 1-bit or 1-byte value or text symbol. For example, "0" indicates that integrity protection is not enabled, "1" indicates that integrity protection is enabled. Alternatively, a text symbol may indicate whether integrity protection is enabled. For example, "TRUE" indicates that integrity protection is enabled, and "FALSE" indicates that integrity protection is not enabled.

Optionally, it may be prespecified, for example, specified in a standard, or preconfigured, that encryption protection of the CU-UP is enabled by default.

S503: The terminal determines, based on the security negotiation information, whether to enable user-plane integrity protection of the terminal.

After receiving the security negotiation information, the terminal may determine, based on an indication of the security negotiation information, whether to enable user-plane integrity protection of the terminal. Further, whether to enable user-plane integrity protection of the terminal may be determined according to a preset rule.

In this embodiment, the CU-CP determines security negotiation information, and sends the security negotiation information to the terminal. After receiving the security negotiation information, the terminal may determine, based on an indication of the security negotiation information, whether to enable user-plane integrity protection of the terminal. In this way, user-plane security negotiation with the terminal can be completed in a scenario in which the CU-CP and the CU-UP are separated from each other.

Optionally, the security negotiation information may further include an encryption protection identifier (UP Confidentiality indication) of the CU-UP. The encryption protection identifier of the CU-UP is used to indicate whether encryption protection of the CU-UP is enabled.

Similarly, the encryption protection identifier of the CU-UP may be a 1-bit or 1-byte value or text symbol. For example, "0" indicates that encryption protection is not enabled, "1" indicates that encryption protection is enabled. Alternatively, a text symbol may indicate whether encryption protection is enabled. For example, "TRUE" indicates that encryption protection is enabled, and "FALSE" indicates that encryption protection is not enabled.

If the encryption protection identifier of the CU-UP indicates that encryption protection of the CU-UP is enabled, the terminal determines to enable user-plane encryption protection of the terminal. Otherwise, the terminal does not enable user-plane encryption protection of the terminal.

Figure 6:
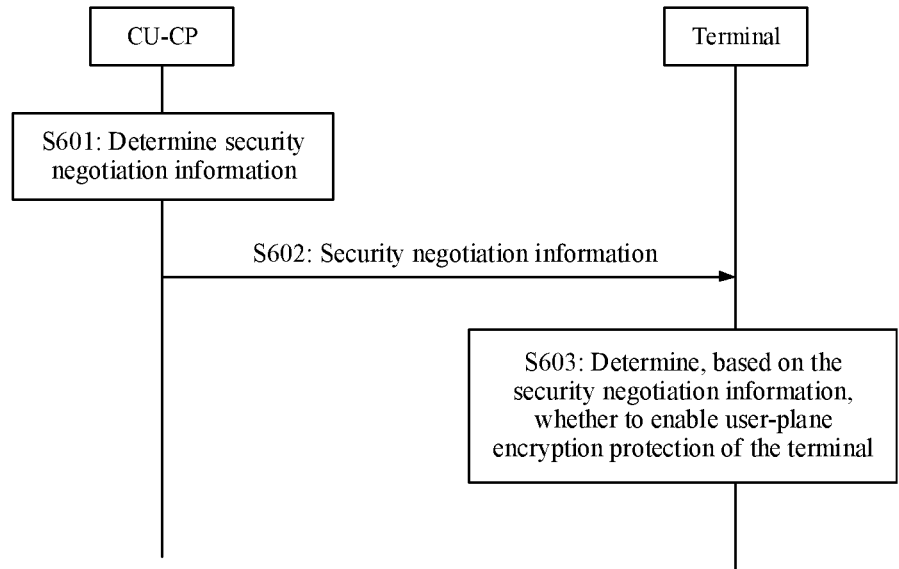
FIG. 6 is a schematic flowchart of a security negotiation method according to another embodiment of this application.

FIG. 6 is a schematic flowchart of a security negotiation method according to another embodiment of this application. As shown in FIG. 6, the method includes the following steps.

S601: A CU-CP determines security negotiation information.

S602: The CU-CP sends the security negotiation information to a terminal, where the security negotiation information includes an encryption protection identifier of a CU-UP.

The encryption protection identifier of the CU-UP is used to indicate whether encryption protection of the CU-UP is enabled.

S603: The terminal determines, based on the security negotiation information, whether to enable user-plane encryption protection of the terminal.

Optionally, when the security negotiation information includes the "encryption protection indication identifier of the CU-UP", it may be prespecified, for example, specified in a standard, or preconfigured, that integrity protection of the CU-UP is enabled by default.

Optionally, the security negotiation information further includes an integrity protection indication identifier of the CU-UP.

In an implementation, the security negotiation information further includes one or more of an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

Further, the integrity protection algorithm identifier of the CU-CP may be a control-plane integrity protection algorithm identifier of the CU-CP, and the encryption protection algorithm identifier of the CU-CP may be a control-plane encryption protection algorithm identifier of the CU-CP. Further, the integrity protection algorithm identifier of the CU-UP may be a user-plane integrity protection algorithm identifier of the CU-UP, and the encryption protection algorithm identifier of the CU-UP may be a user-plane encryption protection algorithm identifier of the CU-UP.

Optionally, in a scenario, the CU-CP and the CU-UP have a same integrity protection algorithm, and in this case, the security negotiation information may indicate an integrity protection algorithm identifier, and/or, the CU-CP and the CU-UP have a same encryption protection algorithm, and in this case, the security negotiation information may indicate an encryption protection algorithm identifier.

It should be noted that the CU-CP and the CU-UP may negotiate the integrity protection algorithm and/or the encryption protection algorithm in advance.

For example, the CU-CP sends algorithm negotiation information to the CU-UP, and the CU-UP determines the integrity protection algorithm of the CU-UP and/or the encryption protection algorithm of the CU-UP, and sends an algorithm negotiation response to the CU-CP. The algorithm negotiation response indicates the integrity protection algorithm of the CU-CP and/or the encryption protection algorithm of the CU-UP. Further, the CU-CP determines the integrity protection algorithms of the CU-CP and the CU-UP and/or the encryption protection algorithms of the CU-CP and the CU-UP based on the algorithm negotiation response.

It should be noted that the integrity protection algorithm includes a control-plane integrity protection algorithm and a user-plane integrity protection algorithm, and the encryption algorithm includes a control-plane encryption algorithm and a user-plane encryption algorithm.

The control-plane integrity protection algorithm is an algorithm used to perform integrity protection on signaling, and the control-plane encryption protection algorithm is an algorithm used to perform encryption protection on signaling.

The user-plane integrity protection algorithm is an algorithm used to perform integrity protection on user data, and the user-plane encryption protection algorithm is an algorithm used to perform encryption protection on data.

Algorithms processed by the CU-CP mainly include a control-plane integrity protection algorithm and a control-plane encryption algorithm, and also include a user-plane integrity protection algorithm and a user-plane encryption algorithm. The CU-UP mainly processes a user-plane integrity protection algorithm and a user-plane encryption algorithm. It is not excluded that subsequently, a DU also needs to process an integrity protection algorithm and an encryption algorithm on a control plane and/or a control plane and a user plane.

After receiving the security negotiation information, the terminal may first verify integrity of the security negotiation information, and then first enable downlink decryption of a control-plane RRC message and integrity protection of the RRC message, and then determine whether integrity protection of the CU-UP and encryption protection of the CU-UP are enabled.

Optionally, that the terminal determines, based on the security negotiation information, whether to enable encryption protection of the terminal and/or integrity protection of the terminal may include at least one of the following cases:

(1) If the security negotiation information includes the integrity protection indication identifier of the CU-UP, and the integrity protection indication identifier of the CU-UP indicates that integrity protection of the CU-UP is enabled, the terminal determines to enable user-plane integrity protection of the terminal.

If the integrity protection indication identifier of the CU-UP indicates that integrity protection of the CU-UP is not enabled, the terminal does not enable user-plane integrity protection of the terminal.

(2) The security negotiation information includes the encryption protection indication identifier of the CU-UP, and the encryption protection indication identifier of the CU-UP indicates that encryption protection of the CU-UP is enabled. In this case, the terminal determines to enable user-plane encryption protection of the terminal.

If the encryption protection indication identifier of the CU-UP indicates that encryption protection of the CU-UP is not enabled, the terminal does not enable user-plane encryption protection of the terminal.

Further, the terminal sends a security negotiation response to the CU-CP.

If the terminal determines to enable integrity protection of the terminal, the security negotiation response includes an integrity protection parameter.

If the terminal determines not to enable integrity protection of the terminal, the security negotiation response includes an integrity protection indication identifier, an integrity protection parameter, and the like of the terminal. The integrity protection indication identifier of the terminal is used to indicate whether the terminal enables integrity protection.

The integrity protection parameter may be a message integrity protection code (message authentication code for integrity (MAC-I)).

It should be noted that if the terminal determines to enable user-plane encryption protection of the terminal, the terminal may enable user-plane encryption protection of the terminal after receiving the security negotiation information, and/or if the terminal determines to enable user-plane integrity protection of the terminal, the terminal may enable user-plane integrity protection of the terminal after receiving the security negotiation information.

In another manner, if the terminal determines to enable encryption protection, the terminal may enable encryption protection of the terminal when sending the security negotiation response, and/or if the terminal determines to enable integrity protection of the terminal, the terminal may enable integrity protection of the terminal when sending the security negotiation response.

Optionally, before determining, by the CU-CP, security negotiation information, the method may further include determining, by the CU-CP, whether the integrity protection indication identifier of the CU-UP is activated.

If the integrity protection indication identifier of the CU-UP is activated, downlink decryption protection of the CU-UP is determined to be enabled. In addition, the CU-CP and/or the CU-UP further records a current value of the integrity protection indication identifier of the CU-UP.

Further, the CU-CP sets an identifier value of the CU-CP, and the identifier value is denoted as a "CU-CP identifier (CP indication)". After the CU-CP determines that both the terminal and the CU-UP enable encryption protection, a value of the CU-CP identifier is set to "activated". For example, a CU-CP identifier "1" indicates "activated", and a CU-CP identifier "0" indicates "unactivated". Alternatively, the value of the CU-CP identifier may alternatively be a text symbol. For example, "TRUE" indicates "enabled", and "FALSE" indicates "not enabled". Alternatively, the CU-CP identifier may include an encryption protection identifier of the CU-CP and an integrity protection identifier of the CU-CP. The CU-CP may notify the terminal right after activation, or the CU-CP may notify the terminal of some related information (for example, configured CU-UP instance information, a tunnel ID of the CU-UP, and related protection information), and the terminal determines whether the integrity protection identifier of the CU-CP is activated. This is not limited in this application.

Optionally, in another manner, the CU-CP sends the CU-CP identifier to the terminal, and the terminal determines, based on the CU-CP identifier, whether to enable control-plane encryption protection of the terminal. For example, when the CU-CP identifier indicates "activated", the terminal enables control-plane encryption protection of the terminal. If the CU-CP identifier indicates that "unactivated", the terminal does not enable control-plane encryption protection of the terminal.

Based on the foregoing embodiment, both the CU-CP and the terminal need to generate a key. Further, a user-plane integrity protection key of the CU-UP, a user-plane encryption protection key of the CU-UP, and the like are generated.

The CU-CP and the terminal may generate an integrity protection key, an encryption key, and the like based on a security key (denoted as K-AN) of an AN. The AN may be one of the foregoing network devices. Details are not described herein again. The security key may be a security key shared by the network device, the terminal, and the like.

It should be noted that a key generation algorithm may be a key derivation function (KDF) or an HMAC-SHA256 algorithm, but is not limited thereto. The key may be generated by inputting, into the key generation algorithm, a parameter that needs to be used.

FIG. 7 is a schematic diagram of key generation according to this application.

In an implementation, as shown in FIG. 1, a CU-CP generates a user-plane integrity protection key of a CU-UP based on a user-plane integrity protection algorithm type identifier of the CU-UP, a user-plane integrity protection algorithm identifier of the CU-UP, and a K-AN, and/or the CU-CP generates a user-plane encryption protection key of the CU-UP based on an encryption protection algorithm type identifier of the CU-UP, a user-plane encryption protection algorithm identifier of the CU-UP, and the K-AN.

Similarly, the CU-CP generates an integrity protection key of the CU-CP based on a control-plane integrity protection algorithm type identifier of the CU-CP, a control-plane integrity protection algorithm identifier of the CU-CP, and the K-AN. The CU-CP generates an encryption protection key of the CU-CP based on a control-plane encryption protection algorithm type identifier of the CU-CP, a control-plane encryption protection algorithm identifier of the CU-CP, and the K-AN.

The algorithm type identifier indicates a type of an algorithm. For example, a user-plane encryption protection algorithm is "UP-enc-alg", and a type value of the algorithm is 0x05. An identifier input of the user-plane encryption protection algorithm may be a text identifier "UP-enc-alg", or a corresponding value 0x05, or a text symbol of a value.

A terminal generates an integrity protection key of the CU-UP based on the user-plane integrity protection algorithm type identifier of the CU-UP, the user-plane integrity protection algorithm identifier of the CU-UP, and the K-AN, and/or the terminal generates a user-plane encryption key based on the user-plane encryption protection algorithm type identifier of the CU-UP, the user-plane encryption protection algorithm identifier of the CU-UP, and the K-AN.

Optionally, the terminal generates a control-plane integrity protection key of the CU-CP based on the control-plane integrity protection algorithm type identifier of the CU-CP, the control-plane integrity protection algorithm identifier of the CU-CP, and the K-AN, and generates a control-plane encryption protection key of the CU-CP based on the control-plane encryption protection algorithm type identifier of the CU-CP, the control-plane encryption protection algorithm identifier of the CU-CP, and the K-AN.

Further, the terminal and the CU-CP may further negotiate related information for generating a key.

In an implementation, a key generation parameter is carried in the security negotiation information.

In another implementation, the CU-CP sends the key generation parameter to the terminal.

The key generation parameter may be an instance identifier, a CU-UP identifier, a DU identifier, a data bearer identifier, a bearer identifier, a stream identifier, a session identifier, a slice identifier, a MAC layer identifier, an RRC signaling counter, a frequency identifier, a cell identifier, a fresh parameter, a user-plane integrity protection algorithm type identifier length of the CU-UP, a user-plane integrity protection algorithm type identifier length of the CU-CP, a user-plane encryption protection type identifier length of the CU-UP, a user-plane encryption protection type identifier length of the CU-CP, or the like.

The CU-UP identifier may be a tunnel identifier, for example, a tunnel endpoint ID (TEID). The instance identifier may be a CU-CP instance identifier, a CU-UP instance identifier, or a DU instance identifier.

The fresh parameter may be a random number Nonce or random number, or the like. The bearer identifier may be a data radio bearer (DRB) ID or a bearer ID.

For example, the integrity protection algorithm may be a null algorithm "NIA 0", and a corresponding value is "0000" in binary. The integrity protection algorithm may be a 128-bit SNOW 3G-based algorithm "128-MA 1", and a corresponding value is "0001" in binary. The integrity protection algorithm may be a 128-bit AES-based algorithm "128-NIA 2", and a corresponding value is "0010" in binary. An identifier input of the integrity protection algorithm may be an algorithm name text identifier, or a corresponding value, or a text symbol of a value.

Alternatively, the encryption protection algorithm may be a null encryption algorithm "NEA 0", and a corresponding value is "0000" in binary. The encryption protection algorithm may be a 128-bit SNOW 3G-based algorithm "128-NEA 1", and a corresponding value is "0001" in binary. The encryption protection algorithm may be a 128-bit AES-based algorithm "128-NEA 2", and a corresponding value is "0010" in binary. The encryption protection algorithm may be a 128-bit ZUC-based algorithm "128-NEA 3", and a corresponding value is "0011" in binary. An identifier input of the encryption protection algorithm may be an algorithm name text identifier, or a corresponding value, or a text symbol of a value.

FIG. 8 is another schematic diagram of key generation according to this application.

After determining an integrity protection algorithm of a CU-UP and/or an encryption protection algorithm of the CU-UP, a terminal may further generate a key with reference to the foregoing key generation parameter.

Further, the terminal generates an integrity protection key of the CU-UP based on the key generation parameter, a user-plane integrity protection algorithm type identifier of the CU-UP, a user-plane integrity protection algorithm identifier of the CU-UP, and a K-AN, and/or the terminal generates an encryption protection key of the CU-UP based on the key generation parameter, a user-plane encryption protection algorithm type identifier of the CU-UP, a user-plane encryption protection algorithm identifier of the CU-UP, and the K-AN.

Similarly, a CU-CP may further generate the integrity protection key of the CU-UP based on the key generation parameter, the user-plane integrity protection algorithm type identifier of the CU-UP, the user-plane integrity protection algorithm identifier of the CU-UP, and the K-AN, and/or the CU-CP generates the encryption protection key of the CU-UP based on the key generation parameter, the user-plane encryption protection algorithm type identifier of the CU-UP, the user-plane encryption protection algorithm identifier of the CU-UP, and the K-AN.

FIG. 9 is still another schematic diagram of key generation according to this application.

In a key generation process, identifiers of different CU-UPs may be further considered. In this way, each CU-UP corresponds to a different key.

Correspondingly, it may be understood that the CU-UP corresponds to different user-plane keys. For example, if the CU-UP corresponds to a session establishment procedure, the user-plane encryption protection key and the user-plane integrity protection key may be based on a session granularity, and two sessions have different user-plane protection keys. That is, an encryption key of one session is different from an encryption key of the other session, and integrity protection keys of the sessions are also different. If the CU-UP corresponds to a bearer setup procedure, such as a bear or a DRB, the user-plane encryption protection key and the user-plane integrity protection key may be based on a bearer granularity, and two bearers have different user-plane protection keys. That is, an encryption key of one bearer is different from an encryption key of another bearer, and integrity protection keys of the bearers are also different.

As shown in FIG. 9, a terminal generates a user-plane integrity protection key of the CU-UP based on the key generation parameter, a user-plane integrity protection algorithm type identifier of the CU-UP, a user-plane integrity protection algorithm identifier of the CU-UP, an identifier of the CU-UP, and a K-AN, and/or the terminal generates an encryption protection key of the CU-UP based on the key generation parameter, a user-plane encryption protection algorithm type identifier of the CU-UP, a user-plane encryption protection algorithm identifier of the CU-UP, the identifier of the CU-UP, and the K-AN.

Referring to FIG. 9, the terminal may first generate an initial key based on the key generation parameter and the K-AN, and then substitute the identifier of the CU-UP, the integrity protection algorithm type identifier, the integrity protection algorithm identifier, (optionally, the key generation parameter is further included), and the like, to generate the integrity protection key. Similarly, the terminal may first generate the initial key based on the key generation parameter and the K-AN, and then substitute the identifier of the CU-UP, the encryption protection algorithm type identifier, the encryption protection algorithm identifier, (optionally, the key generation parameter is further included), and the like, to generate the encryption protection key.

In this embodiment, after obtaining the identifier of the CU-UP, the CU-CP further sends the identifier of the CU-UP to the terminal.

The identifier of the CU-UP may be an identifier that is related to entity differentiation of the CU-UP, such as a tunnel ID.

Optionally, a key may be generated by the CU-UP. Further, the CU-CP generates a base key and sends the base key to the CU-UP, and the CU-UP generates an integrity protection key based on the identifier of the CU-UP, the base key, and the key. Alternatively, the CU-UP generates an integrity protection key of the CU-UP based on the identifier of the CU-UP, a base key, and the key generation parameter. Optionally, when sending the base key, the CU-CP also sends the integrity protection algorithm of the CU-UP and the key generation parameter to the CU-UP.

The base key may be the K-AN, a security key shared with the terminal, a security key generated by the CU-CP based on the K-AN, or the like.

Similarly, the CU-UP generates the encryption protection key of the CU-UP based on the identifier of the CU-UP, the base key, the encryption protection algorithm type identifier of the CU-UP, and the encryption algorithm identifier of the CU-UP. Alternatively, the CU-UP generates the encryption protection key of the CU-UP based on the identifier of the CU-UP, the base key, the encryption protection algorithm type identifier of the CU-UP, and the key generation parameter.

It should be noted that the CU-UP and a DU may be deployed together in a distributed manner. Therefore, the DU may also have a key generation capability. In this case, it needs to be considered that an identifier of the DU is added.

Based on the foregoing embodiments, the session establishment procedure or the bearer setup procedure is further included.

Figure 10:
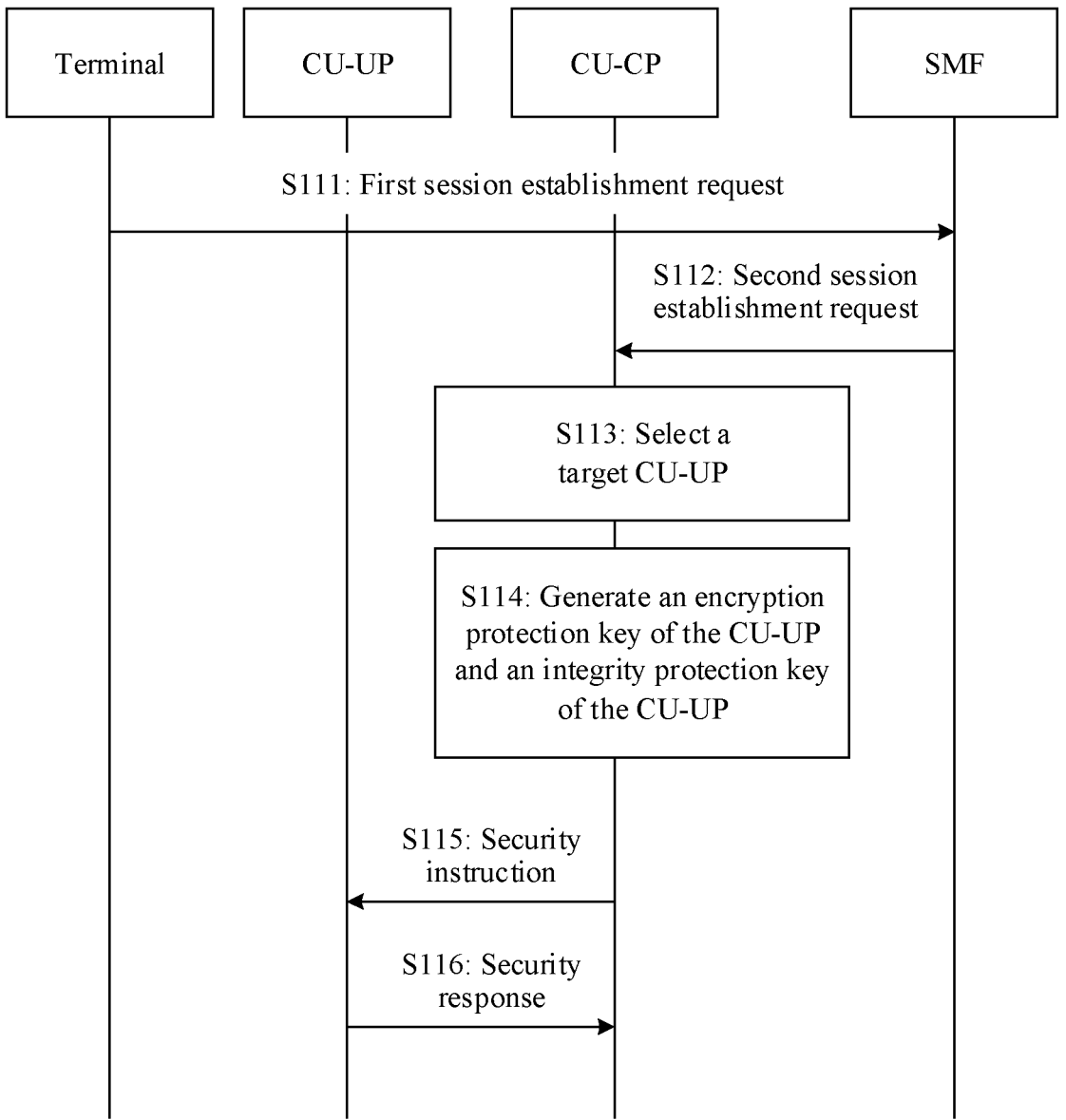
FIG. 10 is a schematic flowchart of a security negotiation method according to another embodiment of this application.

FIG. 10 is a schematic flowchart of a security negotiation method according to another embodiment of this application. As shown in FIG. 10, the method includes the following steps.

S111: A terminal sends a first session establishment request to an SMF.

That is, the terminal initiates session establishment. Certainly, this application is not limited thereto. Alternatively, a network side device, such as the SMF, may initiate a session establishment request. That is, the SMF sends the first session establishment request to the terminal. This is not limited herein.

The first session establishment request includes one or more of the following parameters: S-NSSAI, a DNN, a PDU session ID, a request type, an old PDU session ID, and an N1 SM container (PDU session establishment request). N1 is a name of an interface between the terminal and an access and mobility management function (AMF). An N1 SM container is a container related to a session between the terminal and the AMF.

S112: The SMF sends a second session establishment request to a CU-CP.

The second session establishment request includes one or more of the following parameters: session management information (N2 SM information) between the AMF and a RAN, and a non-access stratum (NAS) message (the PDU session ID and the N1 SM container (PDU Session Establishment Accept)). N2 is a name of an interface between the AMF and a RAN.

Optionally, the SMF transparently transmits the second session establishment request to the CU-CP via a mobility control function (AMF) entity.

S113: The CU-CP selects a target CU-UP. There may be one or more target CU-UPs.

Optionally, after receiving the second session establishment request, the CU-CP first selects the target CU-UP, that is, a target CU-UP to which a session connection needs to be established.

For a bearer setup process, the CU-CP selects a bearer setup request and sends the bearer setup request to the target CU-UP, and completes the following user-plane security activation and negotiation in the bearer setup request.

In an embodiment, S113 is performed before the CU-CP determines security negotiation information. After selecting the target CU-UP, the CU-CP obtains a session-based user-plane integrity protection indication identifier of the target CU-UP and/or an encryption protection indication identifier of the CU-UP based on an identifier of the target CU-UP. A prerequisite is that the CU-CP first obtains integrity protection indication identifiers of all CU-UPs and/or encryption protection indication identifiers of the CU-UPs, selects, based on the identifier of the target CU-UP, the integrity protection indication identifier of the target CU-UP and/or the encryption protection indication identifier of the target CU-UP from the identifiers of the CU-UPs.

Optionally, the integrity protection indication identifier of the CU-UP of the target CU-UP and the encryption protection indication identifier of the CU-UP may not be searched for. In a session establishment process, by default, integrity protection of the CU-UP may not be enabled and encryption protection of the CU-UP may not be enabled. Further, this may be preconfigured or specified in a standard or a protocol. This is not limited in this application.

S114: The CU-CP generates an encryption protection key of the CU-UP and an integrity protection key of the CU-UP based on the identifier of the target CU-UP.

That is, the encryption protection key of the CU-UP and the integrity protection key of the CU-UP may be generated in the session establishment process using the method shown in FIG. 9. However, this is not limited thereto. If the key is generated in a manner in FIG. 7 and FIG. 8 in which the identifier of the CU-UP is not introduced, the key may also be generated before security negotiation. A specific occasion for generating the key is not limited in this application. If the CU-CP generates the encryption protection key of the CU-UP and the integrity protection key of the CU-UP before session establishment is initiated, whether integrity protection of the CU-UP starts to be activated needs to be determined in a subsequent process.

The identifier of the target CU-UP may be an identifier that is related to entity differentiation of the CU-UP, such as a tunnel ID.

Alternatively, when generating an encryption protection key of the CU-CP and an integrity protection key of the CU-CP, the CU-CP also generates the encryption protection key of the CU-UP and the integrity protection key of the CU-UP.

When there are a plurality of target CU-UPs, the CU-CP generates an encryption protection key and an integrity protection key of each CU-UP.

S115: The CU-CP sends a security instruction to the target CU-UP, where the security instruction includes the encryption protection key of the CU-UP, the integrity protection key of the CU-UP, and the integrity protection indication identifier of the CU-UP.

Optionally, the security instruction may further include a session ID and/or the encryption protection indication identifier of the CU-UP, a user-plane encryption protection algorithm of the CU-UP, and a user-plane integrity protection algorithm of the CU-UP.

It should be noted that, if the CU-CP already has the encryption protection key of the CU-UP and the integrity protection key of the CU-UP before the session establishment process, S114 may not be performed. In addition, the security instruction does not include the encryption protection key of the CU-UP or the integrity protection key of the CU-UP.

S116: The target CU-UP sends a security response to the CU-CP, where the security response carries the integrity protection indication identifier of the CU-UP, to indicate whether the CU-UP currently enables integrity protection.

After receiving the security response, the CU-CP records the current integrity protection indication identifier of the CU-UP.

Alternatively, the security response may not carry the integrity protection indication identifier, and the CU-CP considers by default that integrity protection of the CU-UP is enabled.

After S116, the CU-CP sends the security negotiation information to the terminal. The CU-UP in the foregoing embodiment is the target CU-UP selected by the CU-CP.

After receiving the security negotiation information, the terminal may generate a corresponding encryption protection key of the CU-UP and a corresponding integrity protection key of the CU-UP based on an integrity protection algorithm and an encryption protection algorithm of the CU-UP.

Further, in the foregoing embodiment, both the terminal and the CU-UP enable uplink and downlink encryption and decryption, or enable integrity protection. Whether the protection is based on a session or a bearer depends on whether a procedure of interaction between the terminal and the SMF and/or the CU-UP is a session establishment procedure or a bearer setup procedure (related to an air interface radio bearer (DRB). Both cases are applicable.

It should be noted that if the terminal determines, before a session is established, based on the integrity protection indication identifier of the CU-UP, to enable user-plane integrity protection of the terminal, the terminal enables terminal-based user-plane integrity protection and key generation and negotiation. The generated key is also based on a terminal granularity.

If in a session establishment process, for example, the terminal first initiates session establishment, that is, after sending the first session establishment request or receiving the first session establishment request, the terminal determines, based on the integrity protection indication identifier of the CU-UP, to enable user-plane integrity protection of the terminal, the terminal enables session-based user-plane integrity protection and key generation and negotiation. The generated key is based on a session granularity.

If the terminal sends the first session establishment request or receives the first session establishment request, and the first session establishment request includes a DRB identifier, the terminal enables DRB-based user-plane integrity protection and key generation and negotiation. The generated key is based on a DRB granularity.

If the terminal and the CU-UP perform a bearer (Bearer) setup process, the terminal enables and negotiates DRB-based user-plane integrity protection and key negotiation. The generated key is based on a bearer granularity.

Optionally, based on the foregoing embodiment, the CU-CP may further send a second session establishment response to an access and mobility control function (AMF) entity.

Figure 11:
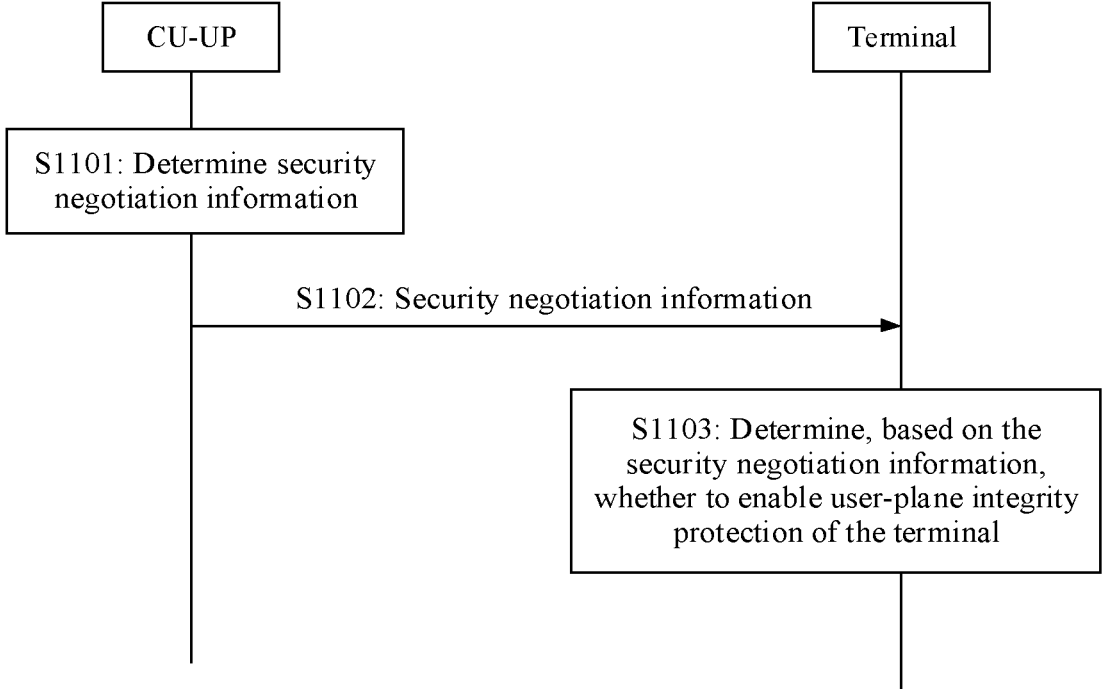
FIG. 11 is a schematic flowchart of a security negotiation method according to still another embodiment of this application.

FIG. 11 is a schematic flowchart of a security negotiation method according to still another embodiment of this application. A difference from the foregoing embodiment is that a CU-UP may perform security negotiation with a terminal. In this embodiment, the CU-UP has a specific message processing capability, and may configure a CU-UP security algorithm list, or receive a security algorithm list sent by a CU-CP, or generate a protection key, including an integrity protection key and an encryption key, and have a capability of negotiating with the terminal, to perform security decoupling of a control plane and a user plane.

As shown in FIG. 11, the method includes the following steps.

S1101: The CU-UP determines security negotiation information.

S1102: The CU-UP sends the security negotiation information to the terminal.

The security negotiation information includes an integrity protection indication identifier (UP confidentiality indication) of the CU-UP. The integrity protection identifier of the CU-UP indicates whether integrity protection of the CU-UP is enabled.

S1103: The terminal determines, based on the security negotiation information, whether to enable user-plane integrity protection of the terminal.

In this embodiment, the CU-UP determines security negotiation information, and sends the security negotiation information to the terminal. After receiving the security negotiation information, the terminal may determine, based on an indication of the security negotiation information, whether to enable integrity protection of the terminal. In this way, security negotiation with the terminal can be completed in a scenario in which the CU-CP and the CU-UP are separated from each other.

In an optional implementation, if the integrity protection identifier of the CU-UP indicates that integrity protection of the CU-UP is enabled, the terminal determines to enable user-plane integrity protection of the terminal.

Otherwise, the terminal does not enable user-plane integrity protection of the terminal.

Optionally, the security negotiation information may further include an encryption protection identifier of the CU-UP. The encryption protection identifier of the CU-UP is used to indicate whether encryption protection of the CU-UP is enabled.

If the encryption protection identifier of the CU-UP indicates that encryption protection of the CU-UP is enabled, the terminal determines to enable user-plane encryption protection of the terminal. Otherwise, the terminal does not enable user-plane encryption protection of the terminal.

Alternatively, in the embodiment shown in FIG. 11, the security negotiation information includes the encryption protection identifier of the CU-UP.

S1103 may be: The terminal determines, based on the security negotiation information, whether to enable user-plane encryption protection of the terminal.

Correspondingly, the security negotiation information may alternatively include the integrity protection indication identifier of the CU-UP.

In an implementation, the security negotiation information further includes one or more of an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

Optionally, in a scenario, the CU-CP and the CU-UP have a same integrity protection algorithm, in this case, the security negotiation information may indicate an integrity protection algorithm identifier, and/or, the CU-CP and the CU-UP have a same encryption protection algorithm, in this case, the security negotiation information may indicate an encryption protection algorithm identifier.

In another scenario, the CU-UP and the CU-CP may respectively send algorithms of the CU-UP and the CU-CP to the terminal. For example, the CU-UP sends an encryption protection algorithm of the CU-UP to the terminal, and the CU-UP sends an integrity protection algorithm of the CU-UP to the terminal, and the CU-CP sends an encryption protection algorithm of the CU-CP to the terminal, and the CU-CP sends an integrity protection algorithm of the CU-CP to the terminal. This is not limited in this application.

Based on the foregoing embodiment, the CU-UP generates an integrity protection key, an encryption protection key of the CU-UP, and the like.

Further, the CU-CP generates a base key and sends the base key to the CU-UP, and the CU-UP generates the integrity protection key based on an identifier of the CU-UP, the base key, an integrity algorithm type identifier, and an integrity algorithm identifier. Alternatively, the CU-UP generates the integrity protection key of the CU-UP based on an identifier of the CU-UP, a base key, and a key generation parameter. Alternatively, the CU-UP generates the integrity protection key of the CU-UP based on an identifier of the CU-UP, a base key, a key generation parameter, an integrity algorithm type identifier, and an integrity algorithm identifier. Optionally, when sending the base key, the CU-CP also sends the integrity protection algorithm of the CU-UP and the key generation parameter to the CU-UP.

The base key may be the K-AN, a security key shared with the terminal, a security key generated by the CU-CP based on the K-AN, or the like.

Similarly, the CU-UP generates the encryption protection key of the CU-UP based on the identifier of the CU-UP, the base key, the encryption protection algorithm type identifier of the CU-UP, and the encryption algorithm identifier of the CU-UP. Alternatively, the CU-UP generates the encryption protection key of the CU-UP based on the identifier of the CU-UP, the base key, the encryption protection algorithm type identifier of the CU-UP, and the key generation parameter.

It should be noted that the CU-UP and a DU may be deployed together in a distributed manner. Therefore, the DU may also have a key generation capability. In this case, it needs to be considered that an identifier of the DU is added.

For a specific key generation process, refer to the foregoing embodiments in FIG. 7 to FIG. 9. Details are not described herein again.

In another implementation, the CU-UP receives the encryption protection key of the CU-UP and the integrity protection key of the CU-UP that are sent by the CU-CP. Further, for a method for generating, by the CU-CP, the encryption protection key of the CU-UP and the integrity protection key of the CU-UP, refer to the foregoing embodiments. Details are not described herein again.

Further, for a session establishment process, refer to the foregoing method embodiments, and refer to the embodiment shown in FIG. 10. Details are not described herein again.

That is, the terminal may initiate session establishment, or a network side, such as an SMF, may initiate session establishment.

Figure 12:
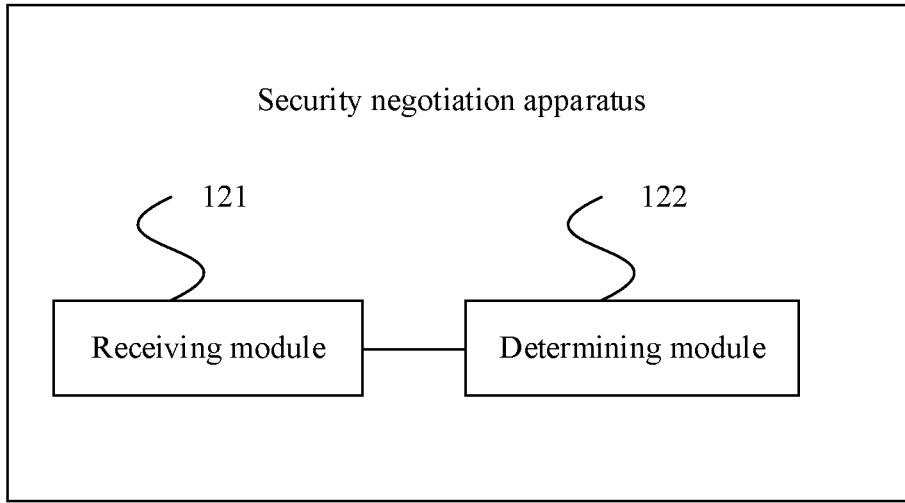
FIG. 12 is a schematic structural diagram of a security negotiation apparatus according to an embodiment of this application.

FIG. 12 is a schematic structural diagram of a security negotiation apparatus according to an embodiment of this application. As shown in FIG. 12, the apparatus includes a receiving module 121 and a determining module 122.

The receiving module 121 is configured to receive security negotiation information sent by a CU-CP, where the security negotiation information includes an integrity protection indication identifier of a CU-UP.

The determining module 122 is configured to determine, based on the integrity protection indication identifier of the CU-UP, whether to enable user-plane integrity protection of the terminal.

Optionally, the security negotiation information further includes a key generation parameter, and the key generation parameter includes one or more of the following an instance identifier, a CU-UP identifier, a data bearer identifier, a bearer identifier, a stream identifier, a session identifier, a slice identifier, a MAC layer identifier, an RRC signaling counter, and a fresh parameter.

Optionally, the receiving module 121 is further configured to receive air interface information sent by the CU-CP, where the air interface information includes a key generation parameter, and the key generation parameter includes one or more of the following an instance identifier, a CU-UP identifier, a data bearer identifier, a bearer identifier, a stream identifier, a session identifier, a slice identifier, a medium access control MAC layer identifier, an RRC signaling counter, and a fresh parameter.

Figure 13:
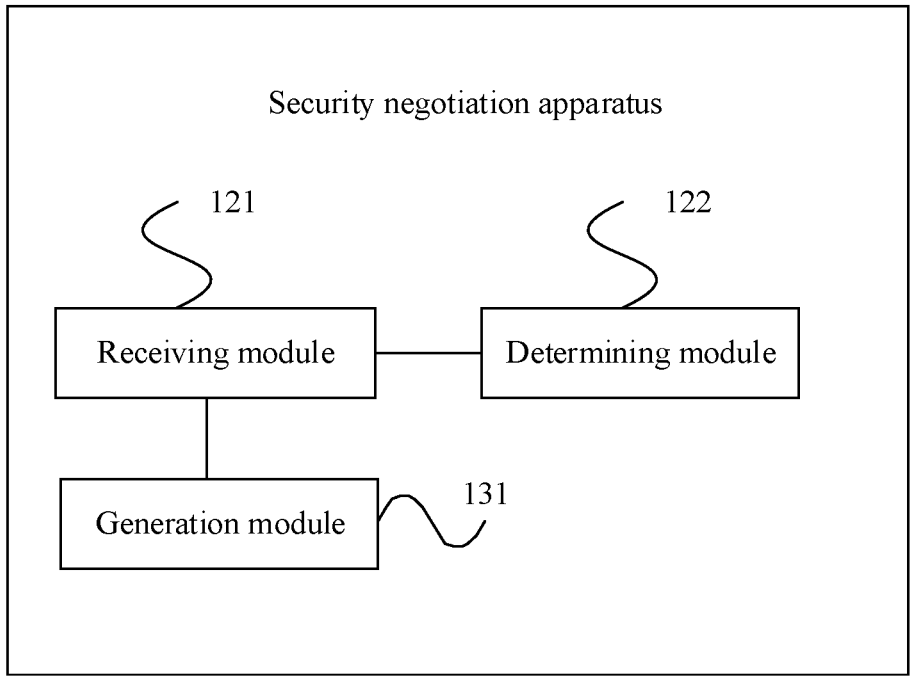
FIG. 13 is a schematic structural diagram of a security negotiation apparatus according to another embodiment of this application.

FIG. 13 is a schematic structural diagram of a security negotiation apparatus according to another embodiment of this application. As shown in FIG. 13, based on FIG. 12, the apparatus further includes a generation module 131 configured to generate a user-plane integrity protection key of the CU-UP based on the key generation parameter.

Figure 14:
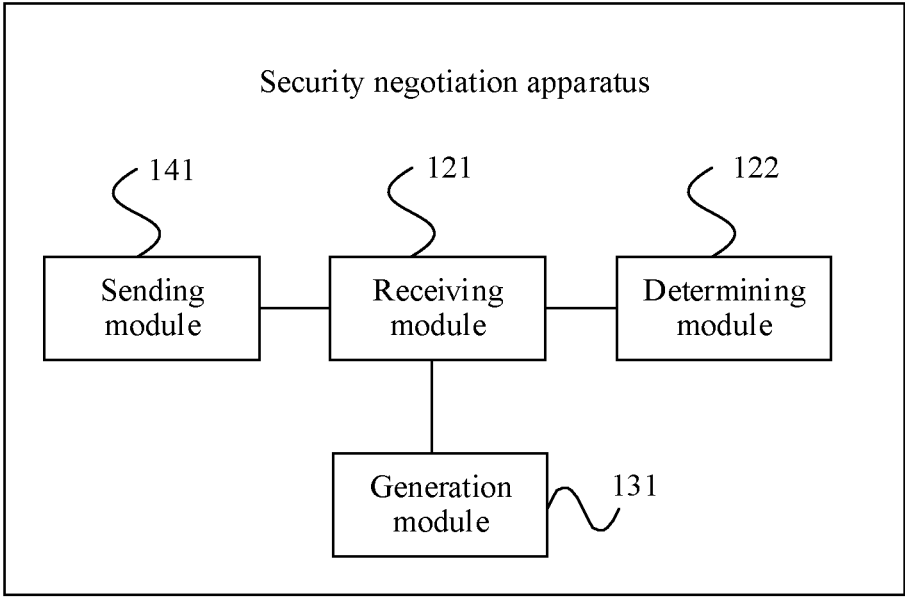
FIG. 14 is a schematic structural diagram of a security negotiation apparatus according to another embodiment of this application.

FIG. 14 is a schematic structural diagram of a security negotiation apparatus according to another embodiment of this application. As shown in FIG. 14, the apparatus may further include a sending module 141 configured to send a first session establishment request to a session management function entity SMF, where the first session establishment request includes one or more of the following parameters one piece or a plurality of pieces of S-NSSAI, a DNN, a PDU session ID, a request type, an old PDU session ID, and an N1 SM container.

Optionally, the determining module 122 is further configured to determine, after sending the first session establishment request to the SMF, based on the integrity protection indication identifier of the CU-UP, whether to enable integrity protection of the terminal.

Further, the determining module 122 is further configured to determine, when the integrity protection indication identifier of the CU-UP indicates that integrity protection of the CU-UP is enabled, to enable session-based user-plane integrity protection of the terminal.

Further, the determining module 122 is further configured to determine, when the integrity protection indication identifier of the CU-UP indicates that integrity protection of the CU-UP is enabled, to enable user-plane integrity protection of the terminal.

In an implementation, the sending module 141 is configured to send an integrity protection parameter to the CU-CP.

The determining module 122 is further configured to determine, when the integrity protection indication identifier of the CU-UP indicates that integrity protection of the CU-UP is not enabled, not to enable integrity protection of the terminal. Correspondingly, the sending module 141 is configured to send a security negotiation response to the CU-CP, where the security negotiation response includes an integrity protection parameter and an indication identifier that is used to indicate that integrity protection of the terminal is enabled.

Optionally, the security negotiation information further includes an encryption protection indication identifier of the CU-UP, and the determining module 122 is further configured to determine, based on the encryption protection indication identifier of the CU-UP, whether to enable encryption protection of the terminal.

In another implementation, the security negotiation information further includes an encryption protection indication identifier of the CU-UP.

Correspondingly, the determining module 122 is further configured to determine, after the first session establishment request is sent to the SMF, based on the encryption protection indication identifier of the CU-UP, whether to enable session-based encryption protection of the terminal.

Optionally, the generation module 131 is configured to generate a user-plane encryption protection key of the CU-UP based on the key generation parameter.

Optionally, the security negotiation information further includes one or more of an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

The apparatus may be integrated into the terminal or a chip of the terminal. The method performed by the terminal in the foregoing embodiment is implemented by the apparatus. Implementation principles and technical effects are similar. Details are not described herein again.

Figure 15:
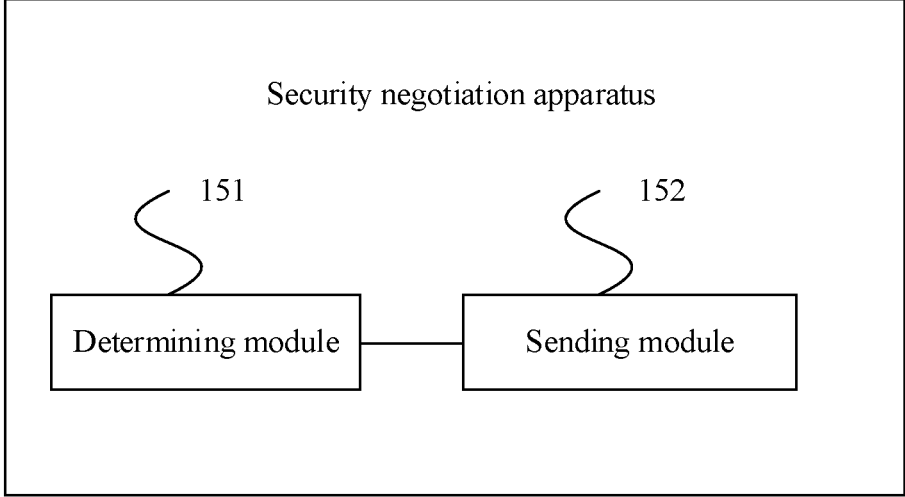
FIG. 15 is a schematic structural diagram of a security negotiation apparatus according to another embodiment of this application.

FIG. 15 is a schematic structural diagram of a security negotiation apparatus according to another embodiment of this application. As shown in FIG. 15, the apparatus includes a determining module 151 and a sending module 152.

The determining module 151 is configured to determine security negotiation information, where the security negotiation information includes an integrity protection indication identifier of a CU-UP.

The sending module 152 is configured to send the security negotiation information to a terminal.

Optionally, the security negotiation information further includes a key generation parameter, and the key generation parameter includes one or more of an instance identifier, a CU-UP identifier, a data bearer identifier, a bearer identifier, a stream identifier, a session identifier, a slice identifier, a medium access control MAC layer identifier, an RRC signaling counter, and a fresh parameter.

Optionally, the sending module 152 is further configured to send air interface information to the terminal, where the air interface information includes a key generation parameter, and the key generation parameter includes one or more of an instance identifier, a CU-UP identifier, a data bearer identifier, a bearer identifier, a stream identifier, a session identifier, a slice identifier, a MAC layer identifier, an RRC signaling counter, and a fresh parameter.

Figure 16:
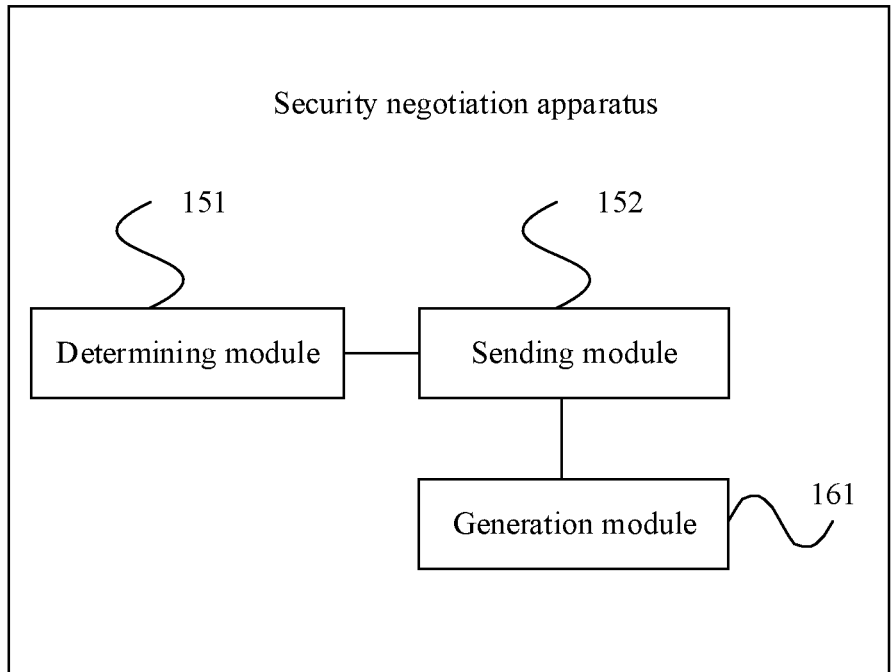
FIG. 16 is a schematic structural diagram of a security negotiation apparatus according to still another embodiment of this application.

FIG. 16 is a schematic structural diagram of a security negotiation apparatus according to still another embodiment of this application. The apparatus further includes a generation module 161 configured to generate a user-plane integrity protection key of the CU-UP based on the key generation parameter.

The sending module 152 is further configured to send the integrity protection key of the CU-UP to the CU-UP.

In an implementation, the security negotiation information further includes an encryption protection indication identifier of the CU-UP.

Correspondingly, the generation module 161 is configured to generate an encryption protection key of the CU-UP based on the key generation parameter.

Optionally, the sending module 152 is further configured to send the user-plane encryption protection key of the CU-UP to the CU-UP.

Further, in an implementation, the generation module 161 is configured to generate a base key.

The sending module 152 is further configured to send the base key to the CU-UP.

Figure 17:
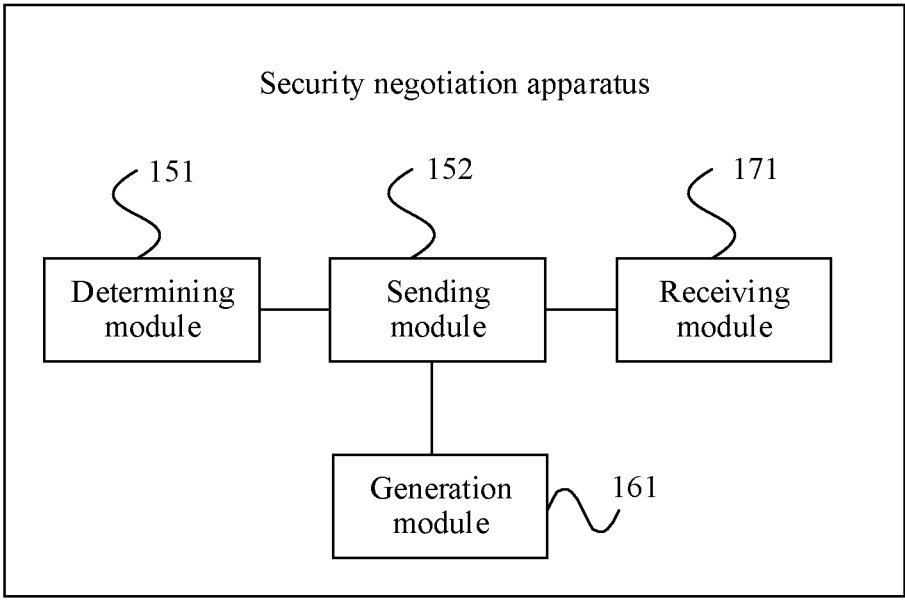
FIG. 17 is a schematic structural diagram of a security negotiation apparatus according to yet another embodiment of this application.

FIG. 17 is a schematic structural diagram of a security negotiation apparatus according to yet another embodiment of this application. As shown in FIG. 17, the apparatus further includes a receiving module 171 configured to receive a second session establishment request sent by a session management function entity SMF after the SMF receives a first session establishment request sent by the terminal.

The sending module 152 is further configured to send a session establishment response to the SMF.

Optionally, the security negotiation information further includes one or more of the following an integrity protection algorithm identifier of the CU-CP, an encryption protection algorithm identifier of the CU-CP, an integrity protection algorithm identifier of the CU-UP, an encryption protection algorithm identifier of the CU-UP, and a message integrity check code.

The apparatus may be integrated into the CU-CP or a chip of the CU-CP. The method performed by the CU-CP in the foregoing embodiment is implemented by the apparatus. Implementation principles and technical effects are similar. Details are not described herein again.

Figure 18:
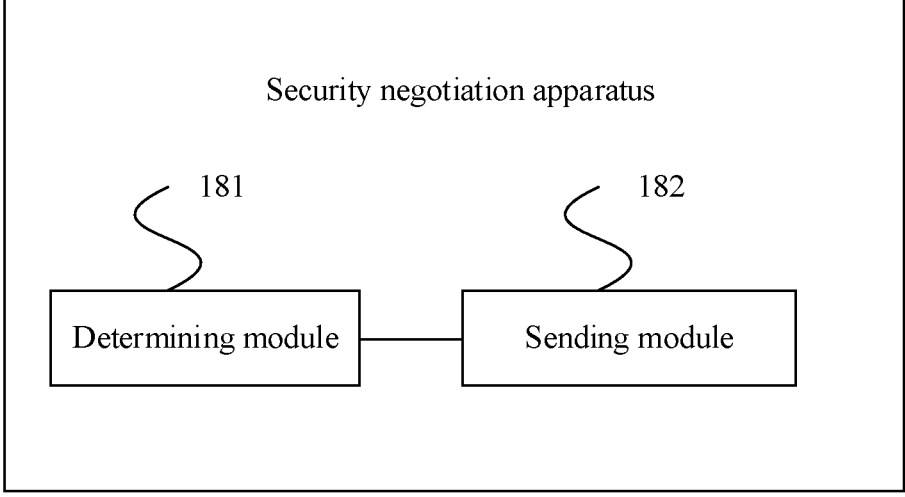
FIG. 18 is a schematic structural diagram of a security negotiation apparatus according to another embodiment of this application.

FIG. 18 is a schematic structural diagram of a security negotiation apparatus according to another embodiment of this application. As shown in FIG. 18, the apparatus includes a determining module 181 and a sending module 182.

The determining module 181 is configured to determine security negotiation information, where the security negotiation information includes an integrity protection indication identifier of a CU-UP.

The sending module 182 is configured to send the security negotiation information to a terminal.

Optionally, the security negotiation information further includes a key generation parameter, and the key generation parameter includes one or more of an instance identifier, a CU-UP identifier, a data bearer identifier, a bearer identifier, a stream identifier, a session identifier, a slice identifier, a MAC layer identifier, an RRC signaling counter, and a fresh parameter.

The sending module 182 is further configured to send air interface information to the terminal, where the air interface information includes a key generation parameter, and the key generation parameter includes one or more of an instance identifier, a CU-UP identifier, a data bearer identifier, a bearer identifier, a stream identifier, a session identifier, a slice identifier, a MAC layer identifier, an RRC signaling counter, and a fresh parameter.

Figure 19:
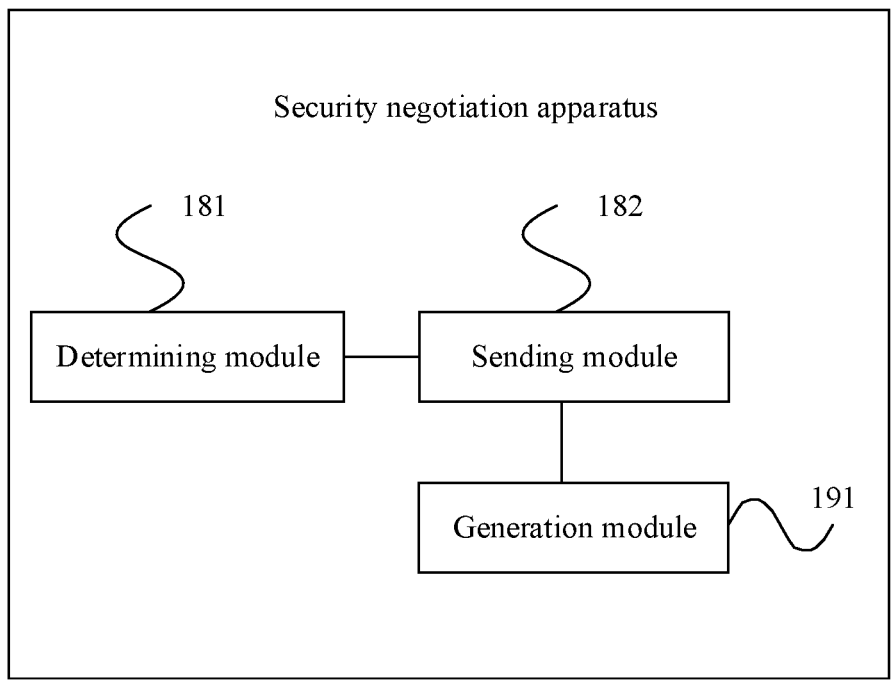
FIG. 19 is a schematic structural diagram of a security negotiation apparatus according to another embodiment of this application.

FIG. 19 is a schematic structural diagram of a security negotiation apparatus according to another embodiment of this application. The apparatus may include a generation module 191 configured to generate a user-plane integrity protection key of the CU-UP based on the key generation parameter.

Optionally, the security negotiation information further includes an encryption protection indication identifier of the CU-UP.

Correspondingly, the generation module 191 is configured to generate a user-plane encryption protection key of the CU-UP based on the key generation parameter.

The apparatus may be integrated into the CU-UP or a chip of the CU-UP. The method performed by the CU-UP in the foregoing embodiment is implemented by the apparatus. Implementation principles and technical effects are similar. Details are not described herein again.

It should be noted that it should be understood that division into the modules of the apparatus is merely logical function division. In an actual implementation, all or some modules may be integrated into one physical entity, or the modules may be physically separated. In addition, these modules may be all implemented in a form of software invoked by a processing element, or may be all implemented in a form of hardware, or some modules may be implemented in a form of software invoked by a processing element, and some modules are implemented in a form of hardware. For example, the determining module may be a processing element separately disposed, or may be integrated in a chip of the foregoing apparatus for implementation. In addition, the determining module may alternatively be stored in a memory of the foregoing apparatus in a form of program code, and is invoked by a processing element of the foregoing apparatus to perform a function of the foregoing determining module. Implementations of other modules are similar to the implementation of the determining module. In addition, all or some of the modules may be integrated together, or may be separately implemented. The processing element herein may be an integrated circuit and has a signal processing capability. In an implementation process, steps in the methods or the modules can be implemented using a hardware integrated logical circuit in the processor element, or using instructions in a form of software.

For example, the foregoing modules may be configured as one or more integrated circuits implementing the foregoing methods, for example, one or more application-specific integrated circuits (ASICs), one or more microprocessors (digital signal processors (DSPs)), or one or more field-programmable gate arrays (FPGAs). For another example, when a module is implemented in a form of program code invoked by a processing element, the processing element may be a general-purpose processor, for example, a central processing unit (CPU) or another processor that can invoke the program code. For another example, the modules may be integrated together, and implemented in a form of a system-on-a-chip (SOC).

Figure 20:
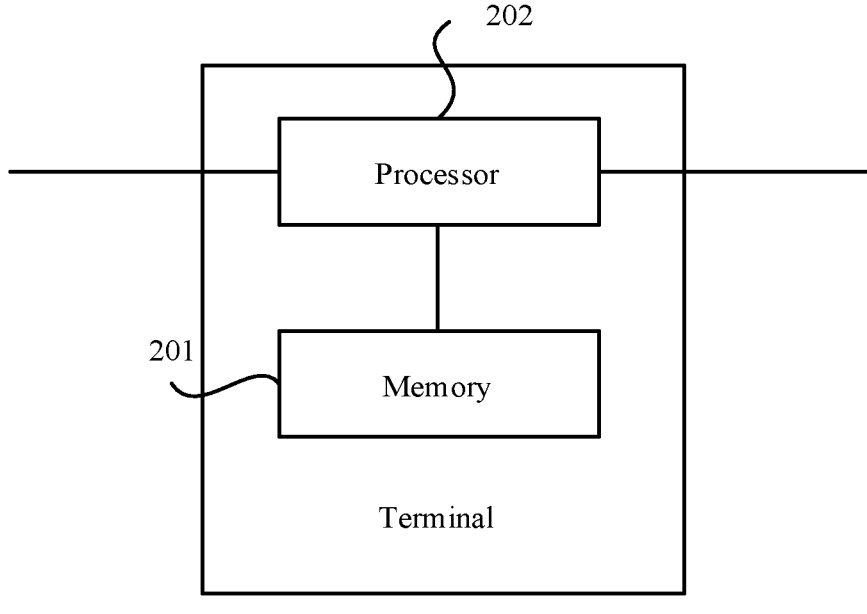
FIG. 20 is a schematic structural diagram of a terminal according to an embodiment of this application.

FIG. 20 is a schematic structural diagram of a terminal according to an embodiment of this application. As shown in FIG. 20, the terminal may include a memory 201 and a processor 202.

The memory 201 may be an independent physical unit, and may be connected to the processor 202 through a bus. The memory 201 and the processor 202 may be integrated together, and implemented using hardware, or the like.

The memory 201 is configured to store a program for implementing the foregoing method embodiments, and the processor 202 invokes the program to perform operations of the foregoing method embodiments performed by the terminal.

Figure 21:
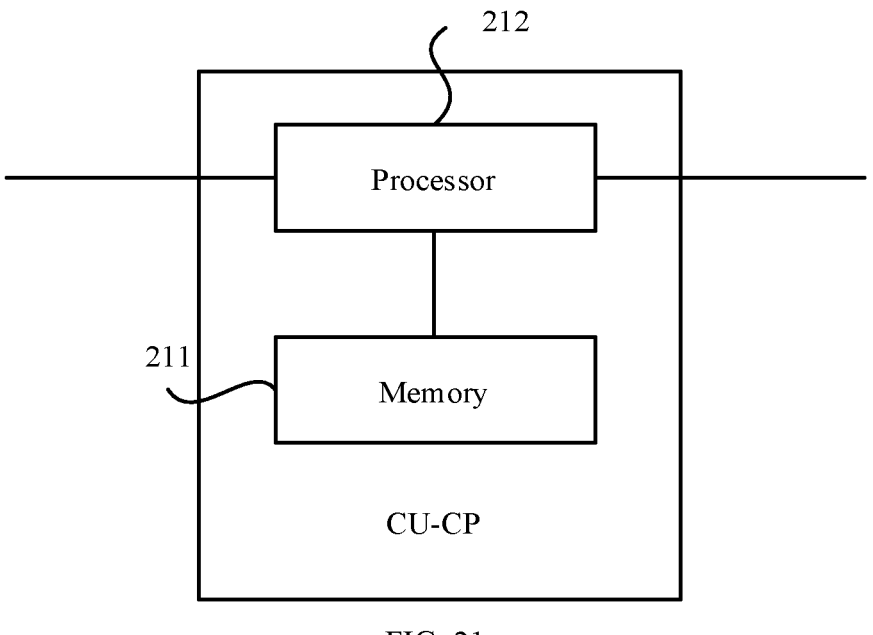
FIG. 21 is a schematic structural diagram of a CU-CP according to an embodiment of this application.

FIG. 21 is a schematic structural diagram of a CU-CP according to an embodiment of this application. As shown in FIG. 21, the CU-CP may include a memory 211 and a processor 212.

The memory 211 may be an independent physical unit, and may be connected to the processor 2102 through a bus. The memory 211 and the processor 212 may be integrated together, and implemented using hardware, or the like.

The memory 211 is configured to store and implement the foregoing method embodiments, and the processor 212 invokes the program to perform operations of the foregoing method embodiments performed by the CU-CP.

Figure 22:
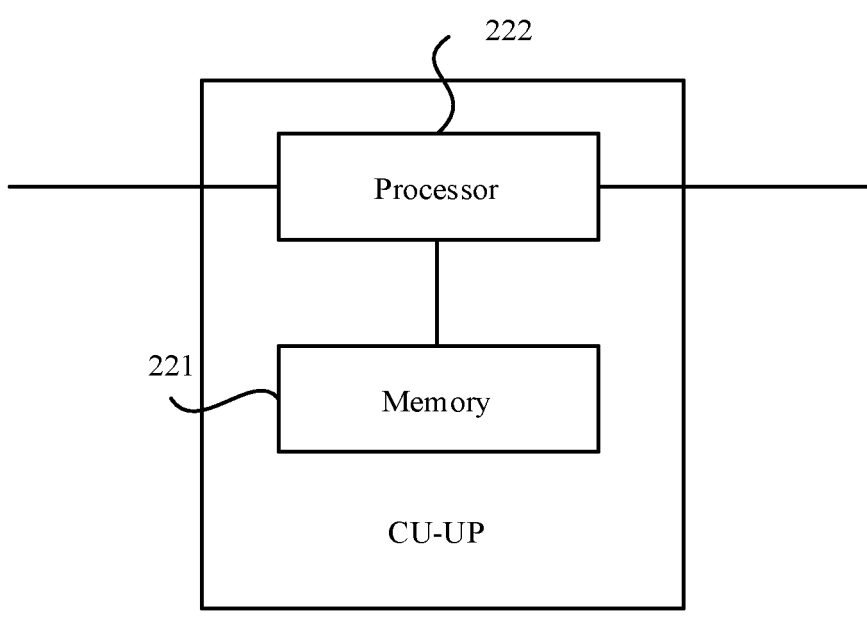
FIG. 22 is a schematic structural diagram of a CU-UP according to an embodiment of this application.

FIG. 22 is a schematic structural diagram of a CU-UP according to an embodiment of this application. As shown in FIG. 22, the CU-UP may include a memory 221 and a processor 222.

The memory 221 may be an independent physical unit, and may be connected to the processor 222 through a bus. The memory 201 and the processor 222 may be integrated together, and implemented using hardware, or the like.

The memory 221 is configured to store and implement the foregoing method embodiments, and the processor 222 invokes the program to perform operations of the foregoing method embodiments performed by the CU-UP.

Optionally, when a part or all of the security negotiation methods in the foregoing embodiments are implemented using software, the security negotiation apparatus may alternatively include only a processor. The memory configured to store the program is located outside the apparatus. The processor is connected to the memory via a circuit/wire, to read and execute the program stored in the memory.

The processor may be a CPU, a network processor (NP), or a combination of a CPU and an NP.

The processor may further include a hardware chip. The hardware chip may be an ASIC, a programmable logic device (PLD), or a combination thereof. The PLD may be a complex PLD (CPLD), an FPGA, a generic array logic (GAL), or any combination thereof.

The memory may include a volatile memory, for example, a random-access memory (RAM), or the memory may include a non-volatile memory, for example, a flash memory, a hard disk drive (HDD), or a solid-state drive (SSD), or the memory may include a combination of the foregoing types of memories.

The invention claimed is:

1. A method comprising:

sending, by an apparatus to a session management function entity (SMF), a first session establishment request;

receiving, by the apparatus from a centralized unit control plane (CU-CP), an integrity protection indication identifier of a centralized unit user plane (CU-UP), wherein the integrity protection indication identifier indicates whether integrity protection of the CU-UP is enabled; and sending, by the apparatus, to the CU-CP, and when determining to enable session-based user-plane integrity protection according to the integrity protection indication identifier, an integrity protection parameter.

2. The method of claim 1, wherein the integrity protection indication identifier is included in security negotiation information, wherein the security negotiation information further comprises a key generation parameter, and wherein the key generation parameter comprises:

an instance identifier;

a CU-UP identifier;

a distributed unit (DU) identifier;

a data bearer identifier;

a bearer identifier;

a stream identifier; or a session identifier.

3. The method of claim 1, wherein determining whether to enable the session-based user-plane integrity protection comprises determining to enable the session-based user-plane integrity protection of the apparatus when the integrity protection indication identifier indicates that integrity protection of the CU-UP is enabled.

4. The method of claim 1, wherein the integrity protection parameter is a message authentication code for integrity (MAC-I).

5. The method of claim 1, further comprising further receiving the integrity protection indication identifier via a Radio Resource Control (RRC) reconfiguration message.

6. An apparatus comprising:

a memory configured to store instructions; and one or more processors coupled to the memory and configured to execute the instructions to cause the apparatus to:

send, to a session management function entity (SMF), a first session establishment request;

receive, from a centralized unit control plane (CU-CP), an integrity protection indication identifier of a centralized unit user plane (CU-UP), wherein the integrity protection indication identifier indicates whether integrity protection of the CU-UP is enabled; and send, to the CU-CP and when determining to enable session-based user-plane integrity protection of the apparatus according to the integrity protection indication identifier, an integrity protection parameter.

7. The apparatus of claim 6, wherein the integrity protection indication identifier is included in security negotiation information, wherein the security negotiation information further comprises a key generation parameter, and wherein the key generation parameter comprises:

a slice identifier;

a media access control (MAC) layer identifier;

a Radio Resource Control (RRC) signaling counter;

a frequency identifier;

a cell identifier;

a fresh parameter;

a user-plane integrity protection algorithm type identifier length of the CU-UP; or a user-plane integrity protection algorithm type identifier length of the CU-CP.

8. The apparatus of claim 6, wherein the one or more processors are configured to execute the instructions to cause the apparatus to enable the session-based user-plane integrity protection when the integrity protection indication identifier indicates that integrity protection of the CU-UP is enabled.

9. The apparatus of claim 6, wherein the integrity protection parameter is a message authentication code for integrity (MAC-I).

10. The apparatus of claim 6, wherein the one or more processors are configured to execute the instructions to cause the apparatus to receive the integrity protection indication identifier via a Radio Resource Control (RRC) reconfiguration message.

11. The apparatus of claim 6, wherein the apparatus is a terminal or a terminal chip.

12. A method comprising:

selecting, by a centralized unit (CU-CP), a target user plane of a centralized unit (CU-UP);

sending, by the CU-CP to the target CU-UP, a security instruction comprising a first integrity protection indication identifier of the target CU-UP;

receiving, by the CU-CP, from the target CU-UP, and in response to the security instruction, a security response comprising a second integrity protection indication identifier of the target CU-UP and indicating whether the target CU-UP currently enables integrity protection; and sending, by the CU-CP to a terminal, security negotiation information comprising the second integrity protection indication identifier.

13. The method of claim 12, wherein the security negotiation information further comprises a key generation parameter, and wherein the key generation parameter comprises an identifier of the target CU-UP.

14. The method of claim 13, further comprising generating a user-plane integrity protection key of the target CU-UP based on the identifier.

15. The method of claim 14, wherein the security instruction further comprises the user-plane integrity protection key.

16. The method of claim 12, wherein the security negotiation information further includes one or more of an integrity protection algorithm identifier of the CU-CP or an integrity protection algorithm identifier of the target CU-UP.

17. The method of claim 12, wherein the second integrity protection indication identifier is a 1-bit symbol, wherein a ""1"" value of the second integrity protection indication identifier indicates that integrity protection is enabled, and wherein a ""0"" value of the second integrity protection indication identifier indicates that the integrity protection is not enabled.

18. An apparatus, wherein the apparatus is a control plane of a centralized unit (CU-CP) or a CU-CP chip, and wherein the apparatus comprises:

a memory configured to store instructions; and one or more processors coupled to the memory and configured to execute the instructions to cause the apparatus to:

select a target user plane of a centralized unit (CU-UP);

send, to the target CU-UP, a security instruction comprising a first integrity protection indication identifier of the target CU-UP;

receive, from the target CU-UP and in response to the security instruction, a security response comprising a second integrity protection indication identifier of the target CU-UP and indicating whether the target CU-UP currently enables integrity protection; and send, to a terminal, security negotiation information comprising the second integrity protection indication identifier.

19. The apparatus of claim 18, wherein the security negotiation information further comprises a key generation parameter, and wherein the key generation parameter comprises an identifier of the target CU-UP.

20. The apparatus of claim 19, wherein the one or more processors are further configured to execute the instructions to cause the apparatus to generate a user-plane integrity protection key of the target CU-UP based on the identifier.

* * * * *